United States Patent
Koo

(10) Patent No.: US 10,631,263 B2
(45) Date of Patent: Apr. 21, 2020

(54) GEOLOCATING A USER EQUIPMENT

(71) Applicant: VIAVI Solutions Inc., San Jose, CA (US)

(72) Inventor: Eng Wei Koo, Colorado Springs, CO (US)

(73) Assignee: VIAVI Solutions Inc., San Jose, CA (US)

( * ) Notice: Subject to any disclaimer, the term of this patent is extended or adjusted under 35 U.S.C. 154(b) by 0 days.

(21) Appl. No.: 16/162,088

(22) Filed: Oct. 16, 2018

(65) Prior Publication Data
US 2020/0092838 A1    Mar. 19, 2020

Related U.S. Application Data

(60) Provisional application No. 62/731,459, filed on Sep. 14, 2018.

(51) Int. Cl.
*H04W 24/00*    (2009.01)
*H04W 64/00*    (2009.01)
(Continued)

(52) U.S. Cl.
CPC ........ *H04W 64/003* (2013.01); *H04B 7/0617* (2013.01); *H04W 8/18* (2013.01)

(58) Field of Classification Search
CPC ..... H04W 16/28; H04W 4/023; H04W 76/27; H04W 24/08; H04W 24/10;
(Continued)

(56) References Cited

U.S. PATENT DOCUMENTS

| | | | | |
|---|---|---|---|---|
| 7,020,701 B1 * | 3/2006 | Gelvin | .................. | G01D 21/00 250/332 |
| 7,797,367 B1 * | 9/2010 | Gelvin | .................. | G06F 15/173 709/200 |

(Continued)

FOREIGN PATENT DOCUMENTS

| | | |
|---|---|---|
| EP | 2469752 A1 | 6/2012 |
| EP | 2469761 A1 | 6/2012 |

(Continued)

OTHER PUBLICATIONS

3GPP, "3rd Generation Partnership Project; Technical Specification Group Radio Access Network; Study on eNB(s) Architecture Evolution for E-UTRAN and NG-RAN (Release 15)," https://portal.3gpp.org/desktopmodules/Specifications/SpecificationDetails.aspx?specificationId=3365, Mar. 2018, 15 pages.

(Continued)

*Primary Examiner* — Joseph Arevalo
(74) *Attorney, Agent, or Firm* — Harrity & Harrity, LLP

(57) ABSTRACT

A device may determine an identity associated with a user equipment (UE) or traffic on multiple interfaces of a network by correlating identifiers associated with the UE or the traffic across the multiple interfaces. The identity may uniquely identify a subscriber associated with the UE or the traffic. The traffic may identify a set of cells, with a respective set of beams, associated with the UE. The device may determine a respective set of measurements for the respective set of beams after determining the identity. The device may determine a location of the UE based on the set of cells, the respective set of beams, and the respective set of measurements. The device may perform one or more analyses related to the UE, the set of cells, or the respective set of beams.

20 Claims, 13 Drawing Sheets

(51) Int. Cl.
*H04B 7/06* (2006.01)
*H04W 8/18* (2009.01)

(58) Field of Classification Search
CPC ......... H04W 36/0079; H04W 36/0094; H04W 36/30; H04W 36/32; H04W 36/38
USPC ...................................................... 455/456.1
See application file for complete search history.

(56) References Cited

U.S. PATENT DOCUMENTS

| | | | |
|---|---|---|---|
| 10,142,276 B2* | 11/2018 | Rapaport | ................ H04L 51/32 |
| 2012/0155324 A1 | 6/2012 | Janakiraman et al. | |
| 2012/0159151 A1 | 6/2012 | Janakiraman et al. | |
| 2013/0064279 A1 | 3/2013 | Nielsen et al. | |
| 2014/0080447 A1 | 3/2014 | Janakiraman et al. | |
| 2014/0344718 A1* | 11/2014 | Rapaport | ................ H04L 51/32 |
| | | | 715/753 |
| 2015/0181442 A1 | 6/2015 | Zinevich | |
| 2015/0327091 A1 | 11/2015 | Curtin et al. | |
| 2016/0065419 A1 | 3/2016 | Szilagyi et al. | |
| 2016/0119796 A1 | 4/2016 | Ho et al. | |
| 2017/0215221 A1* | 7/2017 | Segev | ................... H04W 72/00 |
| 2017/0245175 A1 | 8/2017 | Nambi Raj et al. | |
| 2017/0347251 A1 | 11/2017 | Kim et al. | |
| 2018/0115958 A1* | 4/2018 | Raghavan | ............ H04B 7/0478 |
| 2018/0321687 A1* | 11/2018 | Chambers | ............. H04W 24/08 |
| 2019/0109810 A1* | 4/2019 | Rapaport | ................ H04L 51/32 |
| 2019/0132066 A1* | 5/2019 | Park | .................. H04W 36/0094 |
| 2019/0182800 A1* | 6/2019 | Park | .................... H04W 68/005 |

FOREIGN PATENT DOCUMENTS

| | | |
|---|---|---|
| EP | 2945317 A1 | 11/2015 |
| WO | 2015095846 A2 | 6/2015 |
| WO | 2016091298 A1 | 6/2016 |

OTHER PUBLICATIONS

3GPP, "3rd Generation Partnership Project; Technical Specification Group Radio Access Network; Study on New Radio Access Technology; Radio Interface Protocol Aspects (Release 14)," https://portal.3gpp.org/desktopmodules/Specifications/SpecificationDetails.aspx?specificationId=3070, Mar. 2017, 57 pages.

3GPP, "Scheduling and HARQ support for NR CA," https://portal.3gpp.org/ngppapp/CreateTdoc.aspx?mode=view&contributionId=799570, Jun. 30, 2017, 4 pages.

3GPP, "Clarification on Desired Buffer Size," https://portal.3gpp.org/ngppapp/CreateTdoc.aspx?mode=view&contributionId=845969, Dec. 1, 2017, 6 pages.

3GPP, "On the Details of CSI Acquisition," http://www.3gpp.org/ftp/tsg_ran/wg1_ri1/TSGR1_AH/NR_AH 1706/Docs/, Jun. 30, 2017, 3 pages.

3GPP, "PUCCH resource allocation," http://www.3gpp.org/ftp/tsg_ran/wg1_ri1/TSGR1_AH/NR_AH 1706/Docs/, Jun. 30, 2017, 3 pages.

3GPP, "Test Scope for NR Initial Access and Beam Management at FR2," https://portal.3gpp.orgngppapp/CreateTdoc.aspx?mode=view&contributionId=842909, Dec. 1, 2017, 6 pages.

ETSI, "Digital Cellular Telecommunications System (Phase 2+)," https://www.etsi.oprg/deliver/etsits/133400_133499/08.02.01_60/ts_133401v080201p.pdf, Jan. 2009, 60 pages.

Extended European Search Report for Application No. EP18208725.4, dated Jan. 31, 2019, 9 pages.

GSM Association, "Mobile World Congress Americas 2017, San Francisco," https://www.gsma.com/'futurenetworks/events-and-webinars/mwc-americans-san-francisco/,Sep. 12, 2017, 9 pages.

Rohde & Schwarz, "Signal & Spectrum Analyzers," https://www.youtube.com/playlist?list=PLKxVoO5jUTIsxZXja8m6AH-02pBvHdGrE, Oct. 10, 2018, 10 pages.

Rohde & Schwarz, "Network Analyzers," https://www.youtube.com/playlist?list=PLKxVoO5jUTIV9gmf65Rj7v8uQ0F9TwW, Mar. 19, 2018, 7 pages.

Rohde & Schwarz, "R&S® TSME6 Ultracompact Drive Test Scanner; All bands, all technologies, Simultaneously, Future-Proof Upgradability," http://cdn.rohde-schwarz.com/pws/dl_downloads/dl_common_library/dl_brochure_and_datasheets/pdf_1/service_support_30/TSME6_bro_en_3607.873-12_v0201.pdf, Jun. 28, 2018, 16 pages.

Sanjole, Inc., "WaveJudge 5000 LTE Analyzer," http://www.sanjole.com/our-products/lteanalyzer/, Dec. 2, 2008, 2 pages.

SGLLABS, "GenComm (JDSU), GC747A," https://www.sglabs.it/en/product.php?s=gencommjdsu-gc747a&id=1822, Oct. 12, 2018, 20 pages.

Sibila A., "5G: Initial 5GTF Coverage Measurements (part 2)," https://blog.mobile-network-testing.com/market-technology-trends/evolving-technologies/5g-coverage-measurements/, Jun. 12, 2018, 6 pages.

Sibila A., et al., "5G NR Network Deployment is Now—Lets Test!," Oct. 2018, 59 pages.

Telecomsource, "LTE Security Architecture," http://www.telecomsource.net/entry.php?658-LTE-Security-Architecture&style=12, Retrieved on Jul. 12, 2018, 3 pages.

VIA VI Solutions Inc., "T-BERD/MTS-5800 Handheld Network Tester," https://www.viavisolutions.com/en-us/products/t-berd-mts-5800-handheld-network-tester, Sep. 12, 2016, 5 pages.

Wikipedia, "Drive Testing," https://en.wikipedia.org/wiki/Drive_testing, Sep. 22, 2010, 3 pages.

Extended European Search Report for Application No. EP18211705.1, dated Apr. 11, 2019, 12 pages.

3GPP, "3rd Generation Partnership Project; Technical Specification Group Radio Access Network; NG-RAN; Architecture description (Release 15)", Sep. 2018, 39 pages.

VIAVI Solutions Inc., "Get geo-located, app-aware insight." https://www.viavisolutions.com/en-us/solutions/real-time-intelligence/nitro/nitro-mobile, Feb. 20, 2018, 4 pages.

VIAVI Solutions Inc., "xSIGHT", https://www.viavisolutions.com/en-us/product-family/xsight, May 17, 2014, 5 pages.

VIAVI Solutions Inc., "ariesoGEO", https://www.viavisolutions.com/en-us/product-family/ariesogeo, Nov. 24, 2015, 8 pages.

VIAVI Solutions Inc., "CellAdvisor", https://www.viavisolutions.com/en-us/product-family/celladvisor, Jun. 19, 2016, 9 pages.

3GPP, "3rd Generation Partnership Project; Technical Specification Group Radio Access Network; Evolved Universal Terrestrial Radio Access (E-UTRA) and NR; Multi-connectivity; Stage 2 (Release 15)", https://portal.3gpp.org/desktopmodules/Specifications/SpecificationDetails.aspx?specificationId=3198, Sep. 2018, 59 pages.

3GPP, "3rd Generation Partnership Project; Technical Specification Group Radio Access Network; Evolved Universal Terrestrial Radio Access Network (E-UTRAN); X2 application protocol (X2AP) (Release 15)", https://portal.3gpp.org/desktopmodules/Specifications/SpecificationDetails.aspx?specificationId=2452, Sep. 2018, 401 pages.

3GPP, "3rd Generation Partnership Project; Technical Specification Group Radio Access Network; NR; Radio Resource Control (RRC) protocol specification (Release 15)", https://portal.3gpp.org/desktopmodules/Specifications/SpecificationDetails.aspx?specificationId=3197, Sep. 2018, 445 pages.

3GPP, "3rd Generation Partnership Project; Technical Specification Group Services and System Aspects; Study of Enablers for Network Automation for 5G; (Release 16)", 3GPP Standard, Technical Report, 3GPP TR 23.791, 3rd Generation Partnership Project (3GPP), France, vol. SA WG2 (V0.3.0), May 2, 2018, pp. 1-19, XP051451264, pp. 1-16, [retrieved on May 2, 2018].

3GPP, "3rd Generation Partnership Project; Technical Specification Group Services and System Aspects; Study on Cellular IoT support and evolution for the 5G System (Release 16)", 3GPP Standard, Technical Report, 3GPP TR 23.724, 3rd Generation Partnership Project (3GPP), Mobile Competence Centre, 650, Route Des Lucioles, F-06921 Sophia-Antipolis Cedex, France, vol. SA WG2 (V0.3.0), May 2, 2018, pp. 1-154, pp. 86-89, XP051451260, [retrieved on May 2, 2018].

(56) References Cited

OTHER PUBLICATIONS

International Search Report and Written Opinion for the Application No. PCT/US2019/031581, dated Oct. 1, 2019, 15 pages.

* cited by examiner

GEOLOCATING A USER EQUIPMENT

RELATED APPLICATION

This application claims priority under 35 U.S.C. § 119 to U.S. Provisional Application No. 62/731,459, filed on Sep. 14, 2018, the content of which is incorporated by reference herein in its entirety.

BACKGROUND

Within a network, interfaces may connect various components to or within the network. For example, in a long-term evolution (LTE) network, interfaces may permit a mobility management entity device (MME), a serving gateway (SGW), a packet data network gateway (PGW), and/or the like to communicate. In 5G/new radio (NR), a base station may transmit a set of beams associated with a cell.

SUMMARY

According to some possible implementations, a method may comprise: monitoring, by a device, traffic associated with a user equipment (UE) on multiple interfaces of a network, wherein the traffic identifies a cell associated with the UE and a set of beams associated with the UE; determining, by the device and after monitoring the traffic, an identity associated with the UE or the traffic on the multiple interfaces by correlating identifiers associated with the UE or the traffic across the multiple interfaces, wherein the identity uniquely identifies a subscriber associated with the UE or the traffic; determining, by the device and after determining the identity, a location of the UE based on the cell and the set of beams; and performing, by the device and after determining the location of the UE, one or more analyses related to the UE, the cell, or the set of beams.

According to some possible implementations, a device may comprise: one or more memories; and one or more processors, communicatively coupled to the one or more memories, configured to: monitor traffic associated with a user equipment (UE) on multiple interfaces of a network, wherein the multiple interfaces include: at least one 4G interface, and at least one 5G interface; correlate, after monitoring the traffic, identifiers associated with the UE or the traffic across the multiple interfaces, wherein the identifiers are associated with an identity that uniquely identifies a subscriber associated with the UE or the traffic; determine, after correlating the identifiers, a location of the UE based on a cell and a set of beams; and perform, after determining the location of the UE, one or more analyses related to the UE, the cell, or the set of beams.

According to some possible implementations, a non-transitory computer-readable medium storing instructions, the instructions comprising: one or more instructions that, when executed by one or more processors of a device, cause the one or more processors to: determine an identity associated with a user equipment (UE) or traffic on multiple interfaces of a network by correlating identifiers associated with the UE or the traffic across the multiple interfaces, wherein the identity uniquely identifies a subscriber associated with the UE or the traffic, wherein the traffic identifies a cell associated with the UE and a set of beams associated with the UE; determine, after determining the identity, a respective set of measurements for the set of beams after determining the identity; determine, after determining the respective set of measurements, a location of the UE based on the cell, the set of beams, and the respective set of measurements; and perform, after determining the location of the UE, one or more analyses related to the UE, the cell, or the set of beams.

DETAILED DESCRIPTION

Figure 1A:
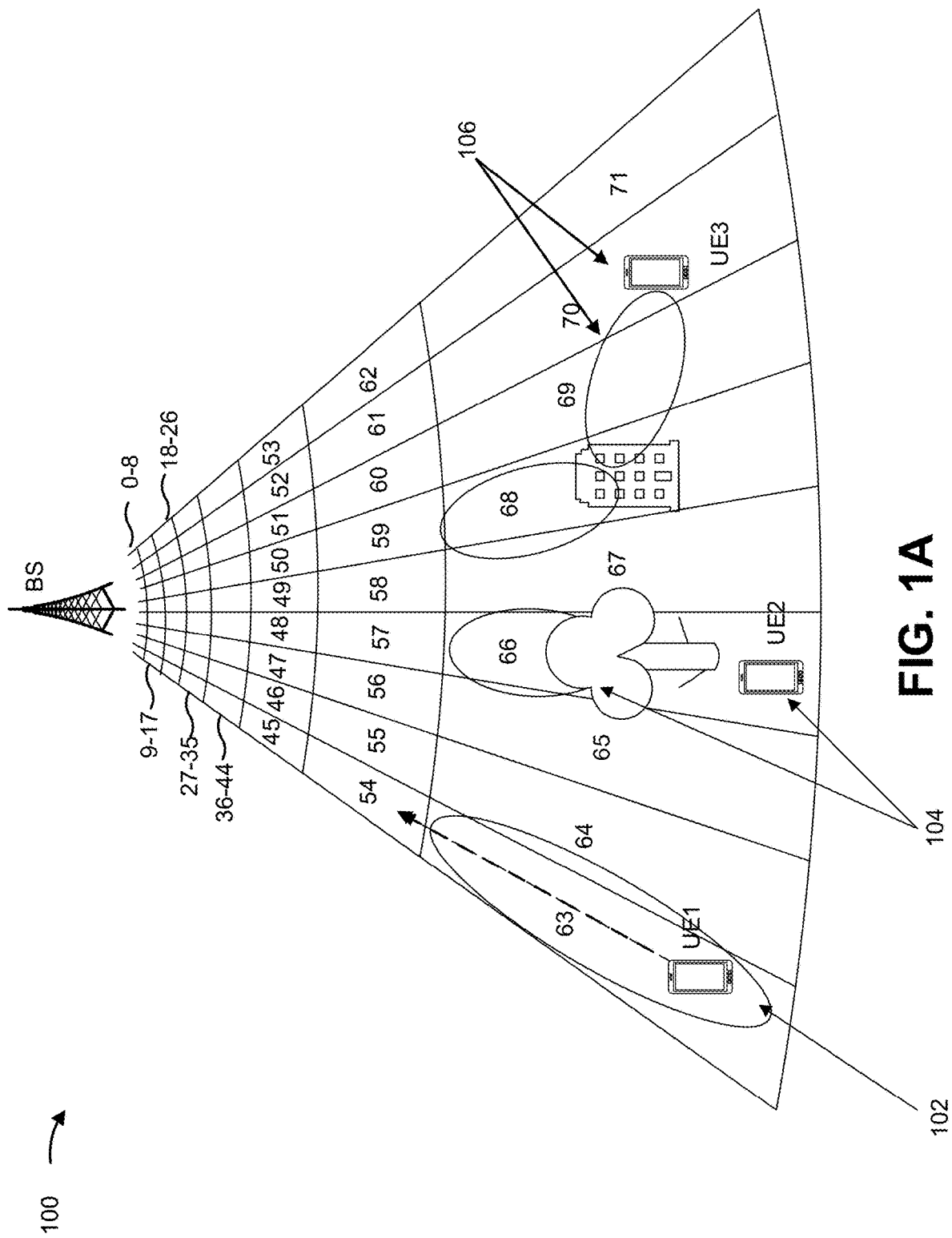
FIGS. 1A-1E are diagrams of an example implementation described herein.

The following detailed description of example implementations refers to the accompanying drawings. The same reference numbers in different drawings may identify the same or similar elements.

A service provider may want to geolocate a user equipment and/or a subscriber. For example, geolocating a user equipment may facilitate an analysis of a user experience with regard to beam coverage for the user equipment, may facilitate identification of issues with the beam coverage, may facilitate optimization of beam coverage, may facilitate beam forming and/or management (including switching, handover, monitoring, recovery, and/or the like), and/or the like. Geolocating a user equipment from a network perspective may be difficult and/or in accurate. For example, a service provider may not have access to location data for the user equipment and may have to rely on a single source of data from a base station to attempt to geolocate the user equipment. This technique may have limited accuracy with regard to geolocating the user equipment (such as based on the quality of base station feeds, which varies widely in terms of feed format and feed contents depending on the base station vendor's implementation, based on time to information associated with the base station feeds, which is typically between one and 15 minutes, and/or the like), may not be sufficiently accurate for the analyses described above, and/or the like. For example, this technique may only provide a cell-level accuracy for geolocating a user equipment, which may only be accurate, at best, to an area of approximately 50 meters by 50 meters in a horizontal plane and not in a vertical plane (e.g., current techniques do not facilitate geolocation of a user equipment in terms of elevation above the ground, such as when the user equipment is located on a floor of a building above a ground-level floor of the building).

Other techniques for geolocating a user equipment may include use of global positioning system (GPS) data. However, to implement this technique, the user equipment and a network may need to perform additional functioning to collect and/or communicate the GPS data, which consumes significant power resources of the user equipment, consumes significant network resources of the network (e.g., bandwidth), and/or the like.

Some implementations described herein provide a traffic monitoring device that is capable of gathering data related to beams from a base station (e.g., three-dimensional coverage beams and/or user-dedicated data beams), beam quality of the beams (e.g., reference signal received quality (RSRQ)), signal-to-interference-plus-noise ratio (SINR) for the beams, a user experience of a user of a UE connected to one or more of the beams, reference signal received power (RSRP) of a beam received by a user equipment, and/or the like. For example, the traffic monitoring device may gather this data from various network interfaces and may correlate the data (e.g., with reference data) to identify a location of the user equipment (e.g., to a cell resolution, to a beam resolution (sub-cell resolution), and/or the like). In this way, the traffic monitoring device may be capable of geolocating the user equipment (e.g., to a GPS location or area associated with the user equipment's reported cell and/or beam identifiers and measurement reports, serving cell and beam identification and measurements, and/or the like) and performing location-based analyses and/or actions with regard to the beam coverage, quality, SINR, and/or the like, with regard to a user experience related to the user equipment, and/or the like. This technique improves an accuracy of geolocating a user equipment in a horizontal plane and/or a vertical plane relative to other techniques that are based on a single source of data from a base station and/or based on GPS data (e.g., which are limited to geolocating a user device in a horizontal plane and not in a vertical plane). In addition, this facilitates location-based analyses that were not previously possible (e.g., facilitates improved resolution, consistency, and/or accuracy of locating a user equipment, reduces latency related to locating a user equipment, and/or the like). Further, this reduces or eliminates a need for reliance on a single source of data to geolocate a user equipment, thereby improving geolocation of the user equipment. Further, this conserves power and/or network resources relative to other techniques for geolocating a user equipment.

FIGS. 1A-1E are diagrams of an example implementation 100 described herein. As shown in FIGS. 1A-1E, implementation 100 includes a base station (BS), multiple user equipment (UEs) (shown as UE1 through UE3), a traffic monitoring device, a mobility management entity (MME), and a serving gateway (SGW).

As further shown in FIG. 1A, the BS may transmit multiple beams (e.g., user-dedicated beams, coverage beams, and/or the like) for a cell, shown as beams 0 through 71 In some implementations, the BS may be configured to transmit a beam to a particular distance from the BS (e.g., to a location which can be horizontal in space and/or vertical in space), with a particular radius, with a beam width (e.g., in degrees), and/or the like. For example, a beam may have a one degree beam width and may be transmitted to a point 20 meters from the BS, resulting in a radius of 0.17 meters.

As shown by reference number 102, UE1 may be within beam coverage of the BS (e.g., may be within a cell coverage associated with the BS). In some implementations, UE1 may receive a set of beams when within beam coverage of the BS. In some implementations, and as further shown by reference number 102, UE1 may be using beam 63 as a connected beam. The implementations described herein apply to both coverage beams (e.g., shown in FIG. 1A) and to user-dedicated data beams. For example, UEs shown in FIG. 1A may be connected to a set of coverage beams, may be connected to a set of user-dedicated data beams, may receive a set of coverage beams (e.g., a set of surrounding coverage beams), may receive a set of user-dedicated data beams (e.g., a set of surrounding user-dedicated data beams), and/or the like. In some implementations, due to overlap of beam coverage (e.g., overlap of synchronization signal and physical broadcast channel (PBCH) blocks (SSBs)), UE1 may be receiving, but not using, one or more other beams that are proximate in location to the connected beam (e.g., referred to as "surrounding beams" herein). For example, based on using beam 63 as a connected beam, UE1 may receive beams 54, 55, and 64 as surrounding beams. In some implementations, surrounding beams that a UE is receiving may be from one or more cells. For example, although FIG. 1A shows a single BS and a single cell, in reality, there may be multiple BSs, each associated with one or more cells. In some implementations, a cell may be associated with one or more coverage beams (e.g., SSBs) and/or one or more user-dedicated data beams (e.g., channel state information reference signals CSI-RSs)).

In some implementations, UE1 may perform various measurements related to the connected beam and/or the set of surrounding beams. For example, UE1 may perform measurements of a respective reference signal received power (RSRP) of the set of beams, a respective reference signal received quality (RSRQ) of the set of beams, a respective signal-to-interference-plus-noise ratio (SINR) of the set of beams, and/or the like. In some implementations, UE1 may perform the various measurements related to the set of beams periodically, according to a schedule, based on being requested by a network provider (by the BS) to perform the various measurements, based on being handed over from one cell to another cell, based on detecting a threshold amount of power associated with a beam, based on an event (e.g., event-triggered), periodically based on an event (e.g., event-triggered periodic), and/or the like.

As further shown by reference number 102, UE1 may be moving toward the BS (e.g., toward beam 54). In some implementations, UE1 may continue to perform the various measurements as the UE moves toward the BS. In this case, values of the measurements may change as UE1 moves toward the BS. For example, values of the measurements for surrounding beam 64 may degrade as UE1 moves away from surrounding beam 64, and values of the measurements for surrounding beams 54 and 55 may improve as the UE moves toward surrounding beams 54 and 55. Similarly, values of the measurements for connected beam 63 may degrade as UE1 moves toward surrounding beam 54, and UE1 may switch from using beam 63 as the connected beam to using beam 54 as the connected beam.

As shown by reference number 104, UE2 may be located within an intended coverage of beam 66 as a connected beam. However, and as further shown by reference number 104, beam 66 may be completely, or partially, obstructed from being received by UE2 by a physical obstruction. In this case, UE2 may be using a beam other than beam 66 as a connected beam, may be using beam 66, with degraded values for measurements, as a connected beam, may not be using a connected beam, and/or the like. In some implementations, UE2 may be receiving surrounding beams, such as beams 65 and 67, may fail to receive an expected surrounding beam due to the physical obstruction, such as beam 57, and/or the like.

In some implementations, UE2 may perform measurements for received beams in a manner that is the same as or similar to that described elsewhere herein. For example, UE2 may fail to determine values or may determine degraded values for a beam that is obstructed by the physical obstruction (e.g., beams 57 and 66). Additionally, or alternatively, and continuing with the previous example, UE2 may determine values for beams being received by UE2 (e.g., beams 65 and 67).

As shown by reference number 106, UE3 may be located in coverage of beam 70 as a connected beam. In addition, and as further shown by reference number 106, UE3 may be receiving beams 60, 61, and/or 69 as surrounding beams. In addition, and as further shown by reference number 106, UE3 may be receiving a beam reflection of beam 68 off of a physical object (e.g., beam 68 may not be a beam that UE3 would normally receive at the location of UE3 shown in FIG. 1A). In some implementations, UE3 may perform measurements of beams received by UE3 in a manner similar to that described elsewhere herein. For example, UE3 may determine a measurement for a beam that is being reflected off the physical object (e.g., a value of the measurement for the reflected beam may fail to satisfy a threshold, may indicate that UE3 is unexpectedly receiving the reflected beam, may indicate interference with another beam that UE3 is receiving, and/or the like).

Figure 1B:
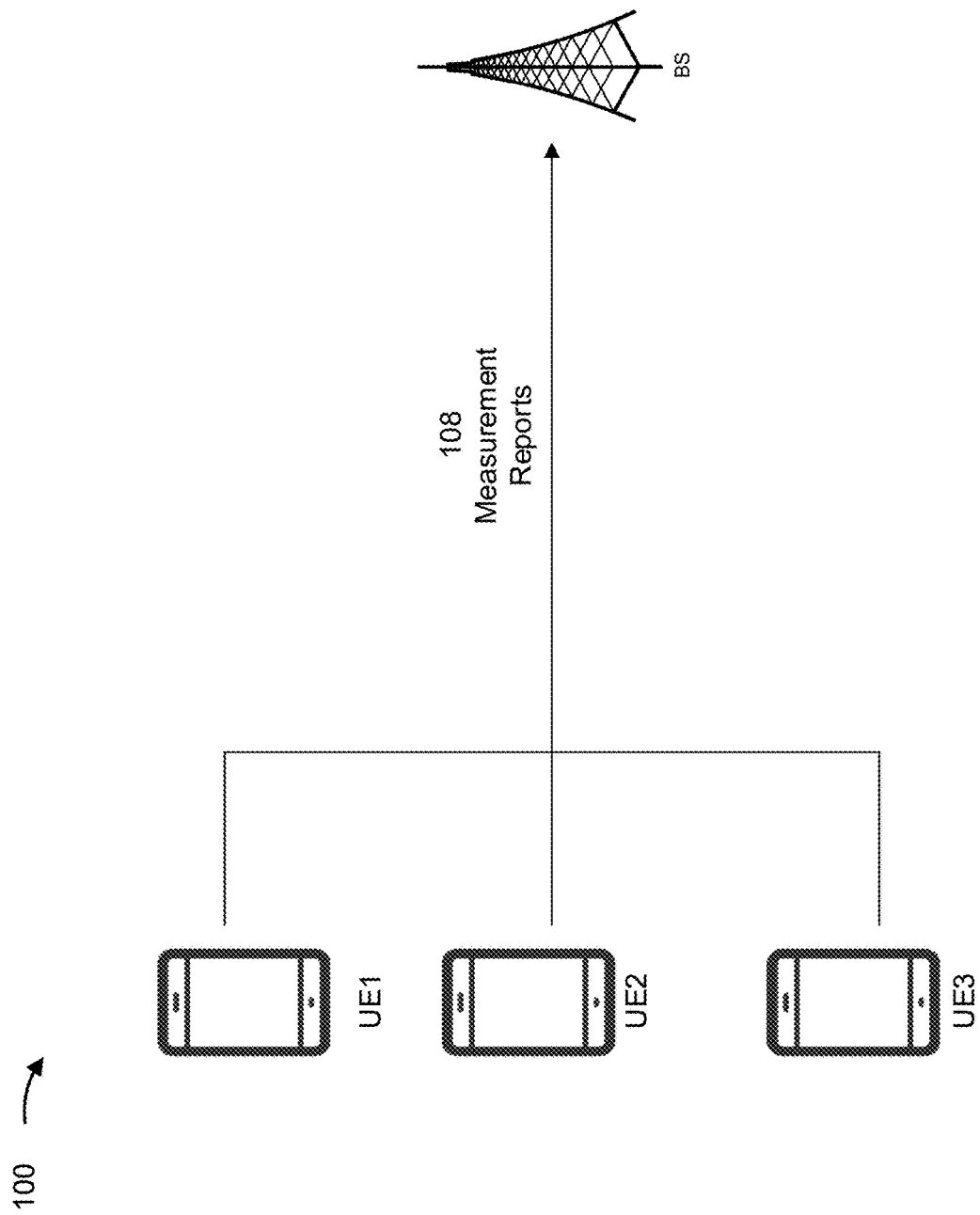

Turning to FIG. 1B, and as shown by reference number 108, UE1 through UE3 may provide, to a BS (e.g., a serving BS when a user equipment is in a connected mode), measurement reports of the measurements that UE1 through UE3 performed. For example, UE1 through UE3 may provide the measurement reports to a 4G master evolved NodeB (MeNB), a 5G secondary next generation NodeB (SgNB), and/or the like. In some implementations, the measurement reports may be included in a radio resource control (RRC) transfer (e.g., a NR measurement report in a RRC container), an uplink (UL) RRC message transfer (e.g., in a RRC container), and/or the like. In some implementations, UE1 through UE3 may provide the measurement reports via an interface. For example, UE1 through UE3 may provide the measurement reports to the 4G MeNB via a long-term evolution (LTE) user (LTE-Uu) interface and the 4G MeNB may then provide the measurement reports to the 5G SgNB via an X2-C interface, directly to the 5G SgNB via an F1-C interface, and/or the like.

In some implementations, UE1 through UE3 may provide the measurement reports periodically (or based on other conditions), according to a schedule, based on receiving a request from a network provider via the BS, based on an event, based on a handover of UE1 through UE3, and/or the like. In some implementations, a measurement report may include information related to the set of beams (e.g., a connected beam, a set of surrounding beams, and/or the like), such as values of measurements. For example, a measurement report may identify a synchronization signal and PBCH block (SSB) identifier (or index) (SSB ID), a channel state information reference signal (CSI-RS) identifier (CSI-RS ID), a RSRP value for the SSB and/or the CSI-RS, a RSRQ value for the SSB and/or the CSI-RS, a SINR value for the SSB and/or the CSI-RS, and/or the like. In some implementations, information included in the measurement report may be on a per-cell and/or a per-beam basis. For example, the information included in the measurement report may be for one or more beams associated with one or more cells (e.g., a serving cell, a listed cell, a detected cell, and/or the like) associated with the BS, for a beam received by a UE (e.g., a beam associated with the cell), and/or the like.

Figure 1C:
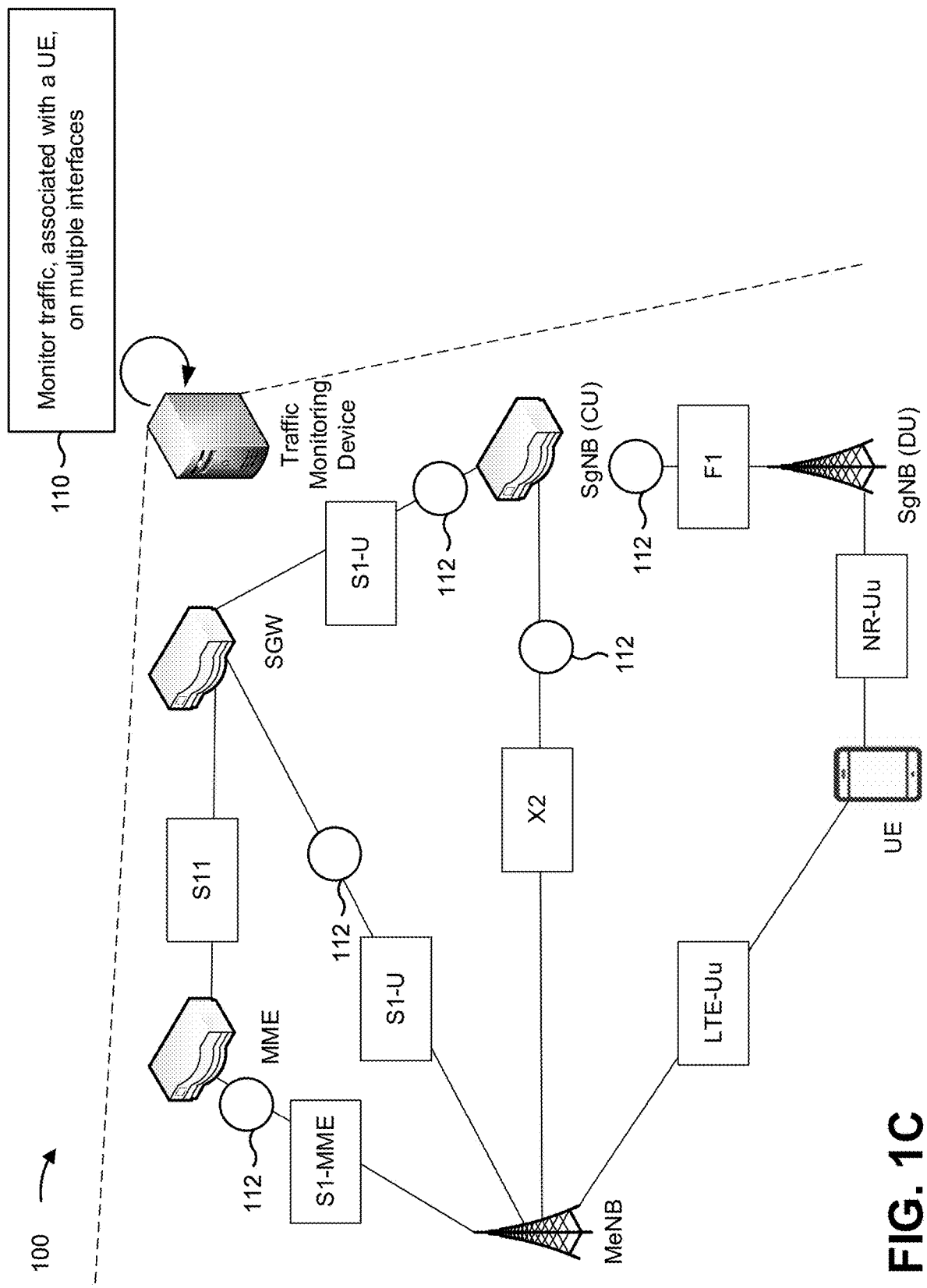

Turning to FIG. 1C, and as shown by reference number 110, a traffic monitoring device may monitor traffic, associated with a UE, on multiple interfaces of a network. For example, the multiple interfaces may include an F1 interface (e.g., an F1-C/U interface) between a 5G SgNB distributed unit (5G SgNB (DU)) and a 5G SgNB central unit (5G SgNB (CU)) (or a separate gNB-CU-control plane (CP) for an F1-C interface and gNB-CU-user plane (UP) for an F1-U interface), an X2 interface (e.g., an X2-C/U interface) between a 4G MeNB and a 5G SgNB (CU), an S1-U interface between a 5G SgNB (CU) and a serving gateway (SGW) or between the 4G MeNB and the SGW, an S1-mobility management entity (MME) (S1-MME) between a 4G MeNB and a MME of a 4G EPC, and/or the like.

In some implementations, the traffic monitoring device may monitor the traffic via a set of network probes 112 deployed on the multiple interfaces. For example, and as shown in FIG. 1C, a first network probe 112 may be deployed on an S1 interface between the 4G MeNB and the MME, a second network probe 112 may be deployed on an S1 interface between the 5G SgNB (CU) and the SGW, a third network probe 112 may be deployed on a X2 interface between the 4G MeNB and the 5G SgNB, a fourth network probe 112 may be deployed on a F1 interface between a 5G SgNB (DU) and the 5G SgNB (CU), and a fifth network probe 112 may be deployed on a S1-U interface between the 4G MeNB and the SGW. Additionally, or alternatively, the traffic monitoring device may receive measurement reports and/or other data related to a set of UEs and/or traffic from the set of UEs from a BS (e.g., included in a data feed from the BS). In some implementations, the traffic monitoring device may use the data from the data feed to supplement information gathered from monitoring an interface, when data cannot be gathered from an interface, and/or the like.

In some implementations, the traffic monitoring device may use a set of data feeds from a drive and/or walk test device, such as a beam scanner, an over-the-air radio analyzer, and/or a UE that generates beam measurements in device logs to supplement determination of a geolocation of a UE. For example, a data feed may include timestamps, GPS coordinates, cell identifiers, beam identifiers, measurements such as SSB RSRP, SSB RSRQ, SSB SINR, CSI-RS RSRP, CSI-RS RSRQ, CSI-RS SINR, and/or the like. In some implementations, the traffic monitoring device may utilize a set of data feeds from the drive and/or walk test device to geolocate a UE when the UE is not connected to a BS, when there is no coverage for the location of the UE, and/or the like such that the traffic monitoring device cannot receive measurement reports from the UE via one of the interfaces described herein.

In some implementations, the traffic may include information related to a UE (e.g., UE1 through UE3), a set of beams associated with the UE, and/or the like. For example, and for the S1-MME interface described above, the traffic may include a subscriber identifier, such as an international mobile subscriber identity (IMSI), an equipment identifier, such as an international mobile equipment identity (IMEI), an IMEI with a software version number (IMEISV), and/or the like. In some implementations, the traffic monitoring device may use this information to correlate measurement reports with a UE (e.g., via an IMSI, an IMEI, an IMEISV, and/or the like), as described elsewhere herein. As another example, and for the X2-C interface, the traffic (e.g., a signaling radio bearer 1 (SRB1)) may include per cell and/or per beam power measurements (e.g., RSRP) and/or quality measurements (e.g., RSRQ, SINR, and/or the like). In some implementations, the traffic monitoring device may use this information to identify a SSB ID, a CSI-RS ID, a RSRP for the SSB and/or the CSI-RS, a RSRQ for the SSB and/or the CSI-RS, a SINR for the SSB and/or the CSI-RS, and/or the like. In some implementations, this information may be included in an X2-application protocol (X2-AP) message, such as a RRC transfer (e.g., a NR measurement report in a RRC container). Similarly, and as an example for the F1-C interface, the traffic (e.g., a signaling radio bearer 3 (SRB3)) may include similar information. Additionally, or alternatively, this information may be included in a F1-AP UL RRC message transfer in a RRC container.

As another example, for a S1-U interface, a X2-U interface, a F1-U interface, and/or a next generation (NG)-U/N3 interface, the traffic may include user plane packets and/or metrics related to the user plane packets. For example, the traffic may include user plane packets to and/or from a UE, information that identifies a quantity of user plane packets transmitted from a UE, a quantity of dropped user plane packets, and/or the like. In some implementations, the traffic monitoring device may use this information to determine throughput of a UE, to perform deep packet inspection, to perform flow control, to perform buffer management analysis, and/or the like.

In some implementations, the traffic monitoring device may monitor the traffic in real-time, based on receiving a copy of the traffic from one or more of the other devices associated with implementation 100, based on receiving a copy of the traffic from an application installed on one or more of the other devices associated with implementation 100, based on requesting the traffic, and/or the like. In some implementations, the traffic monitoring device may not receive contents of the traffic (e.g., a body of a communication), but rather may receive metadata associated with the traffic (e.g., information that can be used to identify a source of the traffic, a destination of the traffic, a network services subscriber associated with the traffic, and/or the like). This maintains a privacy of the traffic that could otherwise be compromised via receipt of contents of the traffic.

In some implementations, the traffic may be ciphered (e.g., encrypted, protected, and/or the like). For example, the traffic may be ciphered utilizing an encryption algorithm, such as a 5G/New Radio (NR) encryption algorithm (NEA) by a SgNB utilizing a secondary node key (S-KgNB), or an evolved packet system (EPS) encryption algorithm (EEA) by a MeNB utilizing a master node key (KeNB). In some implementations, the traffic monitoring device may not monitor traffic between the UE and a set of base stations. For example, the traffic monitoring device may not monitor traffic between the UE and the MeNB (e.g., on the LTE-Uu interface) and/or between the UE and the SgNB (DU) (e.g., on the NR-Uu interface). In this way, the traffic monitoring device does not monitor traffic directly to and/or from the UE. This reduces or eliminates interruptions to communications between the UE and a base station that could occur if the traffic monitoring device monitored traffic directly to and/or from the UE. In addition, this improves a privacy of the traffic. In some implementations, traffic on different interfaces may utilize different identifiers to identify the UE, an account associated with the UE and/or the traffic, a subscriber associated with the traffic and/or the UE, and/or the like. In some implementations, some of the identifiers used on the different interfaces may not uniquely identify the UE, the account, the subscriber, and/or the like.

Figure 1D:
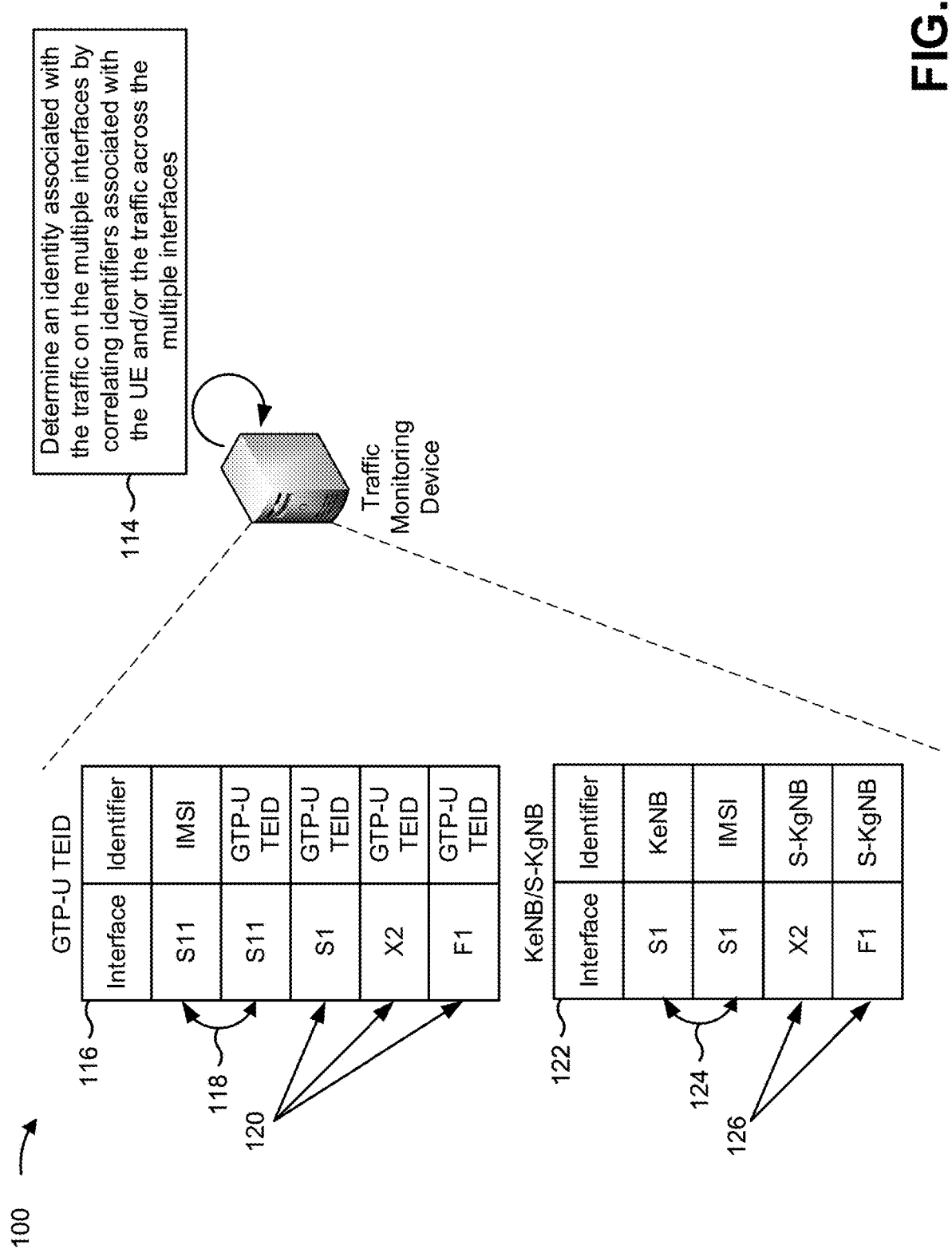

Turning to FIG. 1D, and as shown by reference number 114, the traffic monitoring device may determine an identity associated with the traffic on the multiple interfaces by correlating identifiers associated with the UE and/or the traffic across the multiple interfaces. For example, the traffic monitoring device may correlate different identifiers used on different interfaces in association with the traffic across the multiple interfaces. Continuing with the previous example, a network may utilize a first identifier to identify the UE on a first interface, and may utilize a second identifier to identify the UE on a second interface, and the traffic monitoring device may correlate the first identifier and the second identifier so that the traffic can be associated with the UE, an account, a subscriber, and/or the like regardless of the identifier utilized. In some implementations, an identity may uniquely identify the UE, a subscriber associated with the UE and/or the traffic, an account associated with the UE and/or the traffic, and/or the like. For example, the identity may be based on an IMSI, an IMEI, and/or the like.

As shown by reference number 116, the traffic monitoring device may determine an identity based on a general packet radio service (GPRS) tunneling protocol user plane (GTP-U) tunnel endpoint identifier (TEID) (GTP-U TEID). For example, and as shown by reference number 118, the traffic monitoring device may correlate an IMSI and a GTP-U TEID on an S11 interface (e.g., both the IMSI and the GTP-U TEID may be used in association with traffic on the S11 interface). Continuing with the previous example, and as described in more detail elsewhere herein, signaling on the S11 interface may utilize both the IMSI and the GTP-U TEID in association with establishing a communications session for the UE. In this way, the traffic monitoring device may map traffic that utilizes a GTP-U TEID to an IMSI (e.g., to a UE, to an account, to a subscriber, and/or the like associated with the IMSI). In some implementations, the traffic monitoring device may store information in a data structure, in memory resources of the traffic monitoring device, and/or the like, that identifies a mapping of the GTP-U TEID and the IMSI.

As shown by reference number 120, based on correlating the GTP-U TEID and the IMSI on the S1 interface, the traffic monitoring device can identify an identity for traffic on one or more other interfaces. For example, the traffic monitoring device can map traffic on the S1 interface, the X2 interface, and/or the F1 interface to the same IMSI that was correlated with the GTP-U TEID on the S11 interface. In this way, the traffic monitoring device can determine an identity associated with traffic across multiple interfaces utilizing a GTP-U TEID (e.g., utilizing information that identifies a mapping of the GTP-U TEID and an IMSI).

As shown by reference number 122, the traffic monitoring device may determine an identity based on KeNB and a S-KgNB. For example, and as shown by reference number 124, the traffic monitoring device may correlate an IMSI and a KeNB on an S1 interface (e.g., both the IMSI and the KeNB may be used in association with traffic on the S1 interface). In this way, the traffic monitoring device may map traffic that utilizes a KeNB to an IMSI (e.g., to a UE, to an account, to a subscriber, and/or the like associated with the IMSI). In some implementations, the traffic monitoring device may store information in a data structure, in memory resources of the traffic monitoring device, and/or the like, that identifies a mapping of the KeNB and the IMSI.

As shown by reference number 126, the traffic monitoring device may utilize an S-KgNB to correlate traffic on one or more other interfaces with the IMSI. For example, an S-KgNB may be derived from a KeNB (e.g., via a known process). In some implementations, the traffic monitoring device may determine the S-KgNB that is expected on the one or more other interfaces based on the KeNB identified on the S1 interface. In some implementations, based on determining the S-KgNB, the traffic monitoring device may identify traffic that utilizes the S-KgNB as being associated with the IMSI. In this way, the traffic monitoring device may correlate traffic across multiple interfaces utilizing a KeNB and an S-KgNB.

In some implementations, after determining the identity associated with the traffic, the traffic monitoring device may associate a measurement report with a particular UE (e.g., may associate a first set of measurement reports with a first UE, a second set of measurement reports with a second UE, and/or the like). For example, the traffic monitoring device may associate a measurement report with a particular UE by matching an identifier associated with the measurement report that identifies a source UE of the measurement report and a set of identifiers associated with the particular UE. In some implementations, after associating a measurement report with a particular UE, the traffic monitoring device may identify, using information included in the measurement report, a connected beam that the UE is using (e.g., based on a beam identifier for the connected beam), a set of surrounding beams that the UE is receiving (e.g., based on a respective beam identifier for the set of surrounding beams), respective sets of measurements for the connected beam and/or the set of surrounding beams, a trend in values for the respective sets of measurements, whether the values for the respective sets of measurements satisfy a threshold, and/or the like.

As a specific example related to UE1, the traffic monitoring device may determine that UE1 is using beam 63 as a connected beam, may determine that UE1 is receiving beams 54, 55, and 64, as surrounding beams, may determine that beam 63 is experiencing an increasing SINR value over time, that a RSRP and/or a RSRQ value of beams 54 and 55 are improving over time while the values for the same measurements for beams 63 and 64 are degrading over time, and/or the like based on associating a set of measurement reports with UE1. Additionally, or alternatively, and as a specific example related to UE2, the traffic monitoring device may determine that UE2 is using beam 66 as a connected beam with values for RSRP and/or RSRQ that are below a threshold and/or that are abnormal, may determine that UE2 is failing to use a connected beam, may determine that UE2 is receiving beams 56, 58, 65, and 67 as surrounding beams (or is using one of these beams as a connected beam despite having RSRP, RSRQ, and/or SINR values that fail to satisfy a threshold), may determine that UE2 is failing to receive beam 57 as a surrounding beam (e.g., that beam 57 has a RSRP and/or a RSRQ that fail to satisfy a threshold, that the values of these measurements are abnormal relative to other surrounding beams, and/or the like), and/or the like based on associating a set of measurement reports with UE2.

Additionally, or alternatively, and as a specific example related to UE3, the traffic monitoring device may determine that UE3 is using beam 70 as a connected beam, may determine that UE3 is receiving beams 60, 61, 68, 69, and 70 as surrounding beams but that values of RSRP, RSRQ, SINR, and/or the like for beam 68 satisfy a threshold indicating that beam 68 is an unexpected surrounding beam (e.g., due to a beam reflection of beam 68), may determine that SINR values for beams 69, and/or 70 satisfy a threshold (e.g., based on interference from the beam reflection of beam 68), and/or the like based on associating a set of measurement reports with UE3. As described below, the traffic monitoring device can use this information to determine a location of a UE, to determine a user experience of a user of a UE, to identify physical obstructions to a beam, and/or the like.

Figure 1E:
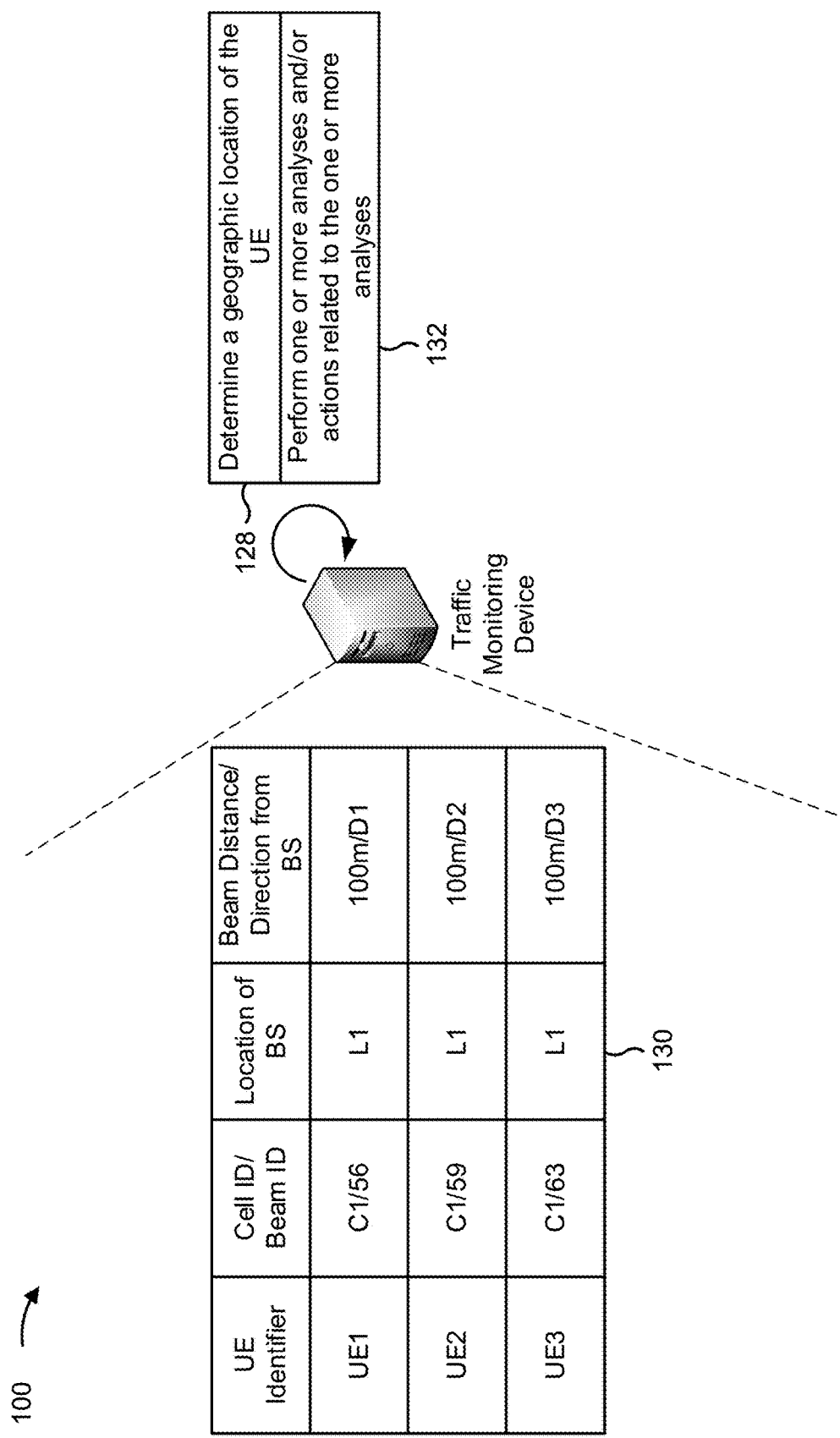

Turning to FIG. 1E, and as shown by reference number 128, the traffic monitoring device may determine a geographic location of the UE (e.g., based on mapping a cell identifier and/or a beam identifier associated with the UE to specific GPS coordinates (or GPS area) via a de-referencing and/or lookup to reference data that identifies a mapping between cell identifiers and/or beam identifies and GPS coordinates). For example, the traffic monitoring device may determine a geographic location of the UE (e.g., UE1 through UE3) after associating a set of measurement reports with the UE (e.g., using cell identifiers and/or beam identifiers with associated measurements for SSBs, CSI-RSs, and/or the like). In some implementations, the traffic monitoring device may determine a geographic location periodically, according to a schedule, in real-time (or near real-time), based on receiving a request from the UE to perform a location-based service for the UE, based on receiving a request from a network provider to perform a location-based service for the UE and/or with respect to multiple UEs, and/or the like.

As shown by reference number 130, the traffic monitoring device may use various information included in a set of measurement reports for the UE, various information related to a beam configuration of a cell, and/or the like to determine the geographic location of the UE. For example, the traffic monitoring device may use a cell identifier (cell ID) and/or a beam identifier (beam ID) from a measurement report in association with determining the geographic location of the UE. Continuing with the previous example, the traffic monitoring device may use the cell ID to identify a cell in which the UE is located, and may use pre-configured location information of a BS associated with the cell (location of BS) (e.g., reference data), such as a geographic location, a set of coordinates, and/or the like, to identify a location of the cell. Continuing still with the previous example, the traffic monitoring device may use the beam ID to identify a particular location in a cell that the UE is located based on pre-configured cell configuration information of the cell (e.g., information that identifies a configuration of beams), based on information that identifies a distance of a beam from the BS (Beam Distance), based on information that identifies a direction of a beam from the BS (e.g., in compass degrees, in cardinal directions, and/or the like) (Direction from BS), and/or the like.

As a particular example, with regard to UE1, the traffic monitoring device may determine that UE1 is located within cell C1, which is associated with a BS at location L1. To improve an accuracy of the determination of the location of UE1, the traffic monitoring device may further determine that within cell C1, UE1 is using beam 63 as a connected beam, and that beam 63 is located approximately 100 meters (m) from the BS in direction D1. In some implementations, the traffic monitoring device may further refine the accuracy of the location of UE1 based on values of measurements for beam 63. For example, the traffic monitoring device may determine whether UE1 is located relatively closer or further from the BS within beam 63 based on a value of a RSRP, a RSRQ, a SINR, and/or the like associated with beam 63. Additionally, or alternatively, and continuing with the previous example, the traffic monitoring device may refine an accuracy of the location of UE1 within beam 63 based on values for the same measurements of surrounding beams received by UE1 (e.g., a value that satisfies a threshold may indicate that UE1 is further or closer to a particular surrounding beam within beam 63). In some implementations, the traffic monitoring device may determine a location of UE2 and UE3 in a similar manner using similar information.

In some implementations, a BS may transmit a beam in a horizontal plane and/or a vertical plane. For example, the BS may transmit a beam in a particular x-axis direction or z-axis direction in a horizontal plane and/or may transmit the beam in a particular y-axis direction (e.g., such as when a beam is transmitted to a particular floor of a building above a ground floor or at an elevated angle from the BS). Some implementations described herein facilitate geolocation of a UE in a horizontal plane and/or a vertical plane. For example, reference data described herein may identify GPS coordinates of a location to which a beam is transmitted, an angle of elevation at which the beam is transmitted, an elevation to which a beam is transmitted, and/or the like, and the UE may use this information, in combination with cell identifiers and/or beam identifiers, to identify a GPS location of the UE, to determine an elevation of the UE at the GPS location, and/or the like. In this way, some implementations described herein facilitate three-dimensional geolocation of a UE (e.g., in a horizontal plane and/or a vertical plane).

In this way, the traffic monitoring device may correlate measurements (e.g., coverage and/or user-centric measurements) with reference data (e.g., cell site global positioning system (GPS) coordinates, a configuration of beams of a cell, phases and/or amplitudes of beams of a cell, estimated and/or projected path loss distance for a beam, and/or the like) to determine a location of a UE, such as within one meter of an actual location of the UE, in some cases, and/or more accurately than using GPS.

As shown by reference number 132, the traffic monitoring device may perform one or more analyses and/or actions related to the one or more analyses. For example, the traffic monitoring device may perform one or more analyses and/or actions related to the one or more analyses after determining a geographic location of the UE.

In some implementations, the traffic monitoring device may determine a movement and/or a direction of the movement of the UE. For example, the traffic monitoring device may identify a change in a connected beam used by the UE and/or a set of surrounding beams received by the UE (e.g., which may indicate a movement or a direction of movement based on information that identifies a beam configuration of a cell), a change in a respective set of measurements associated with the connected beam or the set of overage beams (e.g., decreasing values over time may indicate that the UE is moving away from the BS and/or from a particular beam, increasing values over time may indicate that the UE is moving toward the BS and/or a particular beam, and/or the like), and/or the like.

In some implementations, the traffic monitoring device may identify a location of a physical obstruction of a set of beams associated with the UE. For example, the traffic monitoring device, using information from a set of measurement reports associated with the UE, may identify that the UE is not using a connected beam, may determine that the UE is using an unexpected beam as a connected beam based on values of measurements for the beam failing to satisfy a threshold, based on determining that the connected beam should be a surrounding beam based on one or more other surrounding beams associated with the UE (e.g., may identify that a surrounding beam is missing from an expected set of surrounding beams based on being used as a connected beam), may determine that a value of a measurement associated with one or more beams associated with the UE is abnormal (e.g., is an unexpected value, fails to satisfy a threshold, is abnormal relative to other beams associated with the UE, and/or the like).

In some implementations, the traffic monitoring device may determine that a physical obstruction is present based on this analysis. For example, if the traffic monitoring device determines that the UE is not receiving a particular beam (when receiving other proximately configured beams of the cell) or that the particular beam is associated with values of measurements that are abnormal, the traffic monitoring device may determine that a physical obstruction is present between a location of the UE and the BS. In some implementations, the traffic monitoring device may generate a cell-specific model for coverage of beams associated with the cell, which was trained, via one or more machine learning techniques, on information identifying historical measurements of the beams and locations of various UEs in the cell. For example, the model may be trained during normal use of the cell and/or may have been trained based on results of field testing by a technician (e.g., where an actual location of a UE can be used to correct errors in location determination by the traffic monitoring device). In some implementations, the traffic monitoring device may use the model to process values of measurements from a UE to predict the location of the UE based on the values of the measurements, to improve an accuracy of a location determination based on a beam identifier, and/or the like.

In some implementations, the traffic monitoring device may identify a beam reflection of a beam. For example, the traffic monitoring device may identify that the UE is receiving an unexpected beam based on one or more other beams that the UE is receiving and may identify the beam reflection based on identifying the unexpected beam. Continuing with the previous example, and using information that identifies a configuration of beams of the cell, if the UE is receiving a beam that is not proximate to one or more other beams that the UE is receiving, or is unexpected based on the beams that the UE is receiving, then the traffic monitoring device may determine that the unexpected beam is a beam reflection off of a physical object. In addition, the traffic monitoring device may identify a location of the physical object that is causing the beam reflection based on which unexpected beams the UE is receiving, whether the traffic monitoring device identified a physical obstruction with regard to the unexpected beam for another UE (e.g., may identify a physical obstruction for a beam associated with a first UE as causing a beam reflection received by a second UE), and/or the like.

In this way, the traffic monitoring device may correlate analyses across multiple UEs to identify a location of a physical object causing a physical obstruction and/or a beam reflection, thereby providing an estimation of real-world topography. In some implementations, the traffic monitoring device may correlate this estimation with a virtual map to identify particular buildings, land features, and/or the like that are likely causing an obstruction, a beam reflection, and/or the like (e.g., by plotting the estimated topography on the virtual map using locations of the UE determined above, using pre-configured locations of the BS, and/or the like). This reduces or eliminates a need to deploy a technician to a physical location to identify a cause of an obstruction, a beam reflection, and/or the like, thereby conserving time, fuel, costs, and/or the like associated with deploying the technician.

In some implementations, the UE may determine a shape and/or coverage of a beam of a cell. For example, by aggregating values of measurements from UEs in different locations, the traffic monitoring device may be capable of determining a coverage area of a beam (e.g., based on the beam being received by UEs in different locations), a power and/or quality of the beam within the coverage area of the beam (e.g., based on RSRP and/or RSRQ values from measurement reports of different UEs receiving the beam), areas of interference with respect to coverage beams and/or user-dedicated data beams (e.g., based on SINR values from measurement reports of different UEs receiving the beam), and/or the like.

In some implementations, the traffic monitoring device may determine a performance of communications of the UE and/or a network and may identify an issue with the performance. For example, the traffic monitoring device may determine throughput, jitter, lag, dropped packets, and/or the like based on monitoring traffic other than measurement reports via the network probes 112. In some implementations, the traffic monitoring device may perform a trouble shooting analysis with regard to the performance of the communications and/or an issue with the performance. For example, if the traffic monitoring device identifies an issue related to the performance of the communications of a UE (or if a user of the UE reports an issue), then the traffic monitoring device may determine whether a source of the issue is a network (e.g., radio coverage issues at a location, beam coverage at a location, management of beams, and/or the like), is the UE (or an application associated with the UE when application session data is available to the traffic monitoring device), and/or the like. Continuing with the previous example, the traffic monitoring device may process measurement reports for the UE and/or other UEs proximate to the UE, to determine whether a beam coverage is a possible cause of the issue (e.g., based on determining whether values of measurements fail to satisfy a threshold for the UE and/or one or more other UEs), whether the UE is the source of the issue (e.g., based on determining that the values for the measurements satisfy a threshold, based on determining that traffic from the UE already includes an issue when received by the network, and/or the like), and/or the like.

In some implementations, the traffic monitoring device may generate a map based on determining a respective location for multiple UEs. For example, the traffic monitoring device may generate a map of coverage beams and/or user-dedicated data beams of a cell (e.g., a set of beams associated with the cell) and/or a heat map of the beams (e.g., by overlaying measurements such as RSRP, RSRQ, SINR, data throughput, network optimization, application usage, and/or the like onto a virtual map). Continuing with the previous example, the map may identify locations on a virtual map covered by the set of beams (e.g., the coverage beams and/or the user-dedicated data beams), and the heat map may identify power and/or quality of the set of beams (e.g., the coverage beams and/or the user-dedicated data beams). In some implementations, the traffic monitoring device and/or a user of the traffic monitoring device may use the coverage map for network planning, network cell site prediction (e.g., to predict and/or determine a location for a new cell site such as by utilizing a network cell site prediction system and/or a simulation tool that utilizes modeling and field and/or assurance system test results), and/or improvement of cell coverage (e.g., by using the coverage map to identify dead zones of coverage, physical obstructions, beam reflections, and/or the like). Additionally, or alternatively, and as another example, the traffic monitoring device may generate a virtual map of a respective location of multiple UEs. For example, the traffic monitoring device may generate a virtual map that includes a respective identifier for the multiple UEs (e.g., an icon, a marker, and/or the like). In some implementations, the traffic monitoring device may provide a map for display via a display associated with a UE (e.g., associated with a network technician, a customer, and/or the like).

In some implementations, the traffic monitoring device and/or another device may use a generated map to perform an analysis of a set of beams associated with a cell (e.g., a set of coverage beams and/or a set of user-dedicated data beams) and/or to generate recommendations regarding reconfiguration of coverage of the set of beams. For example, the traffic monitoring device and/or the other device may recommend that physical obstructions be removed, that additional BSs be installed to compensate for a physical obstruction and/or a beam reflection, and/or the like. In some implementations, data related to the generated map may be provided to a third party and/or used by an owner of the traffic monitoring device for network beam-based optimization (e.g., by providing the data to an application and/or a system, such as a customer experience system, a network planning optimization system, a network cell site prediction system, a network automation system, a big data analytics system, and/or the like).

In some implementations, the traffic monitoring device and/or another device may provide location-based services to a UE. For example, the traffic monitoring device and/or another device may provide information for display related to the location of the UE (e.g., restaurants located in the vicinity of the UE, historical information regarding the location, and/or the like). Additionally, or alternatively, and as another example, the traffic monitoring device and/or the other device may provide a set of directions from the UE to a destination input into a navigation application to the UE for display. Additionally, or alternatively, and as another example, the traffic monitoring device and/or the other device may provide the location of the UE to an emergency dispatcher.

In some implementations, the traffic monitoring device may use the location determined in the manner described herein to improve an accuracy of a location of the UE determined using another technique. For example, the traffic monitoring device may improve an accuracy of a location of the UE determined using a global positioning system (GPS) by correcting the determined location, averaging the location from the GPS with the location determined in the manner described herein, weighting locations from different techniques, and/or the like.

In some implementations, the traffic monitoring device may perform the analyses and/or actions described herein in real-time or near real-time (e.g., as the traffic monitoring device monitors a stream of data associated with a UE). Additionally, or alternatively, the traffic monitoring device may perform the analyses and/or actions described herein in a self-learning manner. For example, as new data is received, and/or as results of the analyses and/or actions are corrected by an operator of the traffic monitoring device, the traffic monitoring device may update current and/or future analyses and/or actions. Additionally, or alternatively, the traffic monitoring device may perform the analyses described herein in a time-series manner. For example, the traffic monitoring device may generate time-series maps, may perform topology estimations, and/or the like over time.

In this way, a traffic monitoring device may determine a location of a UE based on a set of beams associated with the UE. This improves an accuracy of determining a location of the UE relative to other techniques, thereby conserving processing resources that would otherwise be consumed determining a less accurate location of the UE (e.g., by improving an accuracy of location determinization to less than one square meter or, in some cases, to less than half of a square meter). In addition, this reduces or eliminates a need for additional communications and/or functioning of the UE to determine a location of the UE by using measurement reports from the UE to determine the location of the UE, thereby conserving power resources of the UE that would otherwise be consumed via other techniques for determining a location of the UE, conserves network resources (e.g., bandwidth) that would otherwise be consumed via other techniques for determining a location of the UE, and/or the like. Further, this facilitates location of a UE in situations when other techniques, such as a GPS-based location, are not possible, such as when the UE being is in a building, in a rural area, and/or the like.

As indicated above, FIGS. 1A-1E are provided merely as an example. Other examples are possible and may differ from what was described with regard to FIGS. 1A-1E. The implementations described herein are applicable to a non-standalone (NSA) with dual connectivity (EN-DC) deployment, a standalone architecture (SA), and/or the like.

Figure 2:
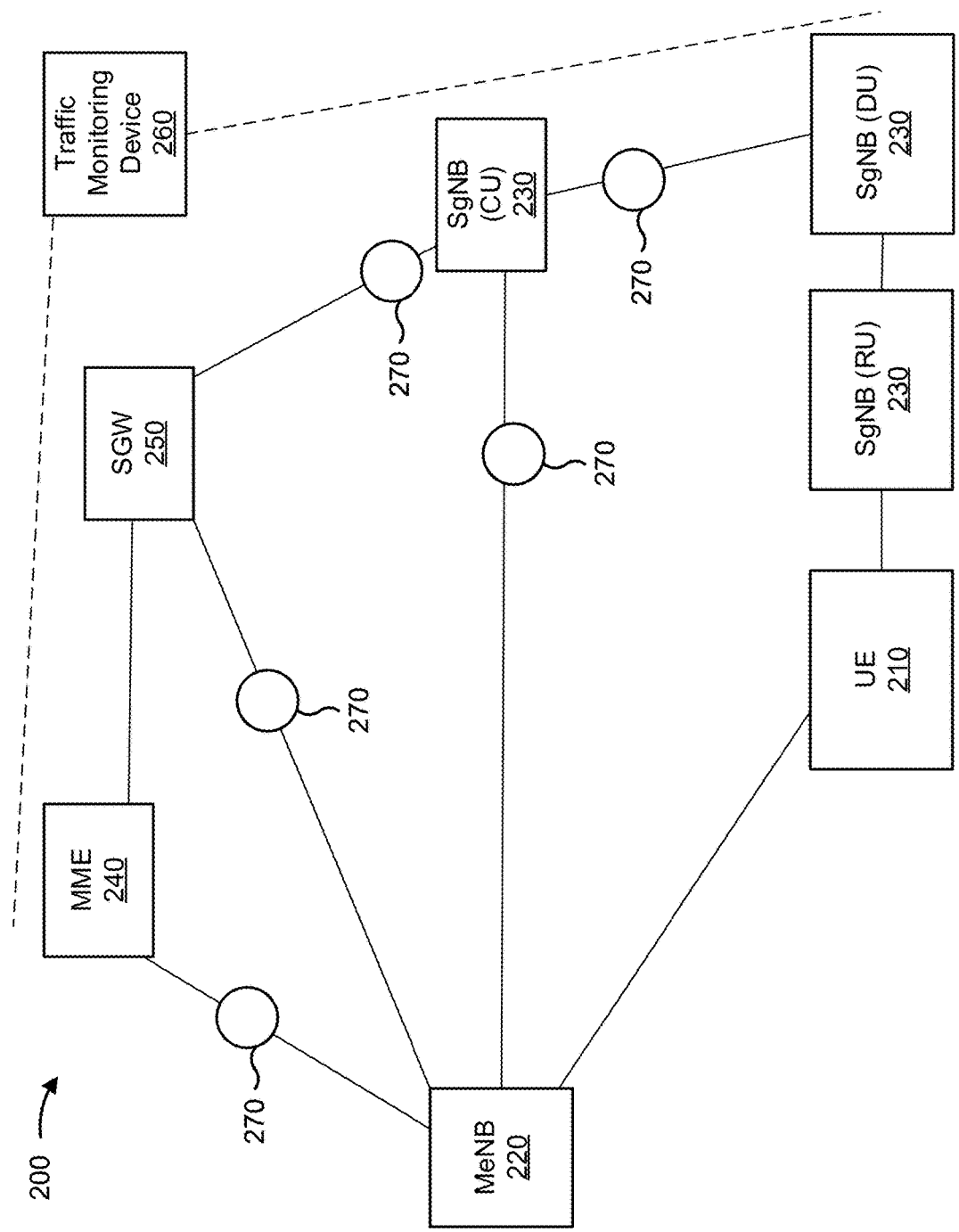
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a UE 210, a MeNB 220, a set of SgNBs 230, a MME 240, a SGW 250, a traffic monitoring device 260, and a network probe 270. Devices of environment 200 may interconnect via wired connections, wireless connections, or a combination of wired and wireless connections.

UE 210 includes one or more devices capable of communicating with a base station (e.g., MeNB 220 and/or the set of SgNBs 230) and/or a network. For example, UE 210 may include a mobile phone (e.g., a smartphone or a radiotelephone), a laptop computer, a tablet computer, a gaming device, a wearable communication device (e.g., a smart wristwatch or a pair of smart eyeglasses), or a similar type of device. Although FIG. 2 shows a single UE 210, in practice, there can be hundreds, thousands, millions, or more UEs 210 communicating with hundreds, thousands, millions, or more base stations, as described elsewhere herein.

Environment 200 may include a set of base stations (e.g., MeNB 220 and/or the set of SgNBs 230). A base station includes one or more devices capable of transferring traffic, such as audio, video, text, and/or other traffic, destined for and/or received from UE 210. In some implementations, a base station may include an eNB, a gNB, and/or the like associated with a long-term evolution (LTE) network, a 3G network, a 4G network, a 5G network, and/or the like that receives traffic from and/or sends traffic to a network via SGW 250 and/or a packet data network gateway (PGW). Additionally, or alternatively, one or more base stations can be associated with a radio access network (RAN) that is not associated with the LTE network. A base station can send traffic to and/or receive traffic from UE 210 via an air interface. In some implementations, a base station may include a small cell base station, such as a base station of a microcell, a picocell, and/or a femtocell.

In some implementations, MeNB 220 may be associated with a 4G network. In some implementations, MeNB 220 may receive a measurement report from UE 210, and may provide the measurement report to SgNB 230, as described elsewhere herein. In some implementations, the set of SgNBs 230 may be associated with a 5G network. In some implementations, the set of SgNBs 230 may receive a measurement report from UE 210, as described elsewhere herein. In some implementations, the set of SgNBs 230 may include a SgNB radio unit (RU) 230, a SgNB (DU) 230, and/or a SgNB (CU) 230, similar to that described elsewhere herein.

MME 240 includes one or more devices, such as one or more server devices, capable of managing authentication, activation, deactivation, and/or mobility functions associated with UE 210. In some implementations, MME 240 can perform operations relating to authentication of UE 210. Additionally, or alternatively, MME 240 can facilitate the selection of a particular SGW 250 and/or a particular PGW to serve traffic to and/or from UE 210. MME 240 can perform operations associated with handing off UE 210 from a first base station to a second base station when UE 210 is transitioning from a first cell associated with the first base station to a second cell associated with the second base station. Additionally, or alternatively, MME 240 can select another MME (not pictured), to which UE 210 should be handed off (e.g., when UE 210 moves out of range of MME 240).

SGW 250 includes one or more devices capable of routing packets. For example, SGW 250 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, SGW 250 can aggregate traffic received from one or more base stations associated with the LTE network, and can send the aggregated traffic to a network (e.g., via a PGW) and/or other network devices associated with an evolved packet core (EPC) and/or an Internet protocol (IP) multimedia subsystem (IMS) core. SGW 250 can also receive traffic from a network and/or other network devices, and can send the received traffic to UE 210 via a base station. Additionally, or alternatively, SGW 250 can perform operations associated with handing off UE 210 to and/or from an LTE network.

Traffic monitoring device 260 includes one or more devices capable of monitoring traffic associated with UE 210 on various interfaces associated with a network, and determining a location of UE 210 based on the traffic. For example, traffic monitoring device 260 may include a server (e.g., in a data center or a cloud computing environment), a data center (e.g., a multi-server micro datacenter), a workstation computer, a virtual machine (VM) provided in a cloud computing environment, or a similar type of device. In some implementations, traffic monitoring device 260 may be a physical device implemented within a housing, such as a chassis. In some implementations, traffic monitoring device 260 may be a virtual device implemented by one or more computer devices of a cloud computing environment or a data center.

Network probe 270 includes one or more devices capable of monitoring traffic on multiple interfaces, such as signaling information, bearer information, and/or measurement reports. For example, network probe 270 may include a probe, a network monitor, a packet sniffer, or a similar type of device. In some implementations, network probe 270 may be deployed on one or more of the multiple interfaces, as described elsewhere herein. Additionally, or alternatively, network probe 270 may provide, to traffic monitoring device 260, information related to traffic that network probe 270 monitors, as described elsewhere herein. In some implementations, network probe 270 may be a physical device deployed on an interface between two other physical devices. In some implementations, network probe 270 may be a virtual device implemented by one or more devices of FIG. 2 or one or more devices not shown in FIG. 2.

The number and arrangement of devices shown in FIG. 2 are provided as an example. In practice, there may be additional devices, fewer devices, different devices, or differently arranged devices than those shown in FIG. 2.

Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
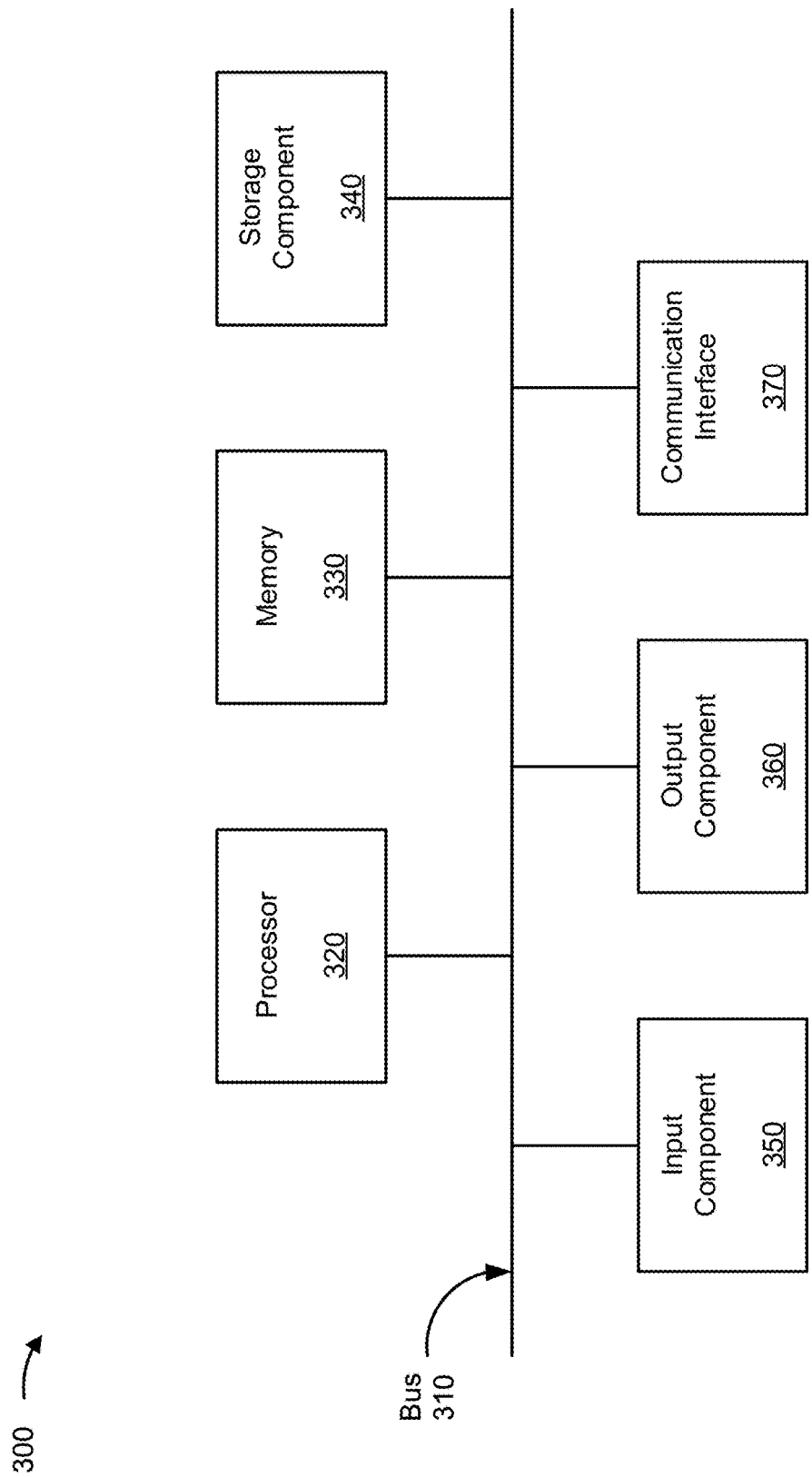
FIG. 3 is a diagram of example components of one or more devices of FIG. 2.

FIG. 3 is a diagram of example components of a device 300. Device 300 may correspond to UE 210, MeNB 220, SgNB 230, MME 240, SGW 250, traffic monitoring device 260, and/or network probe 270. In some implementations, UE 210, MeNB 220, SgNBs 230, MME 240, SGW 250, traffic monitoring device 260, and/or network probe 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
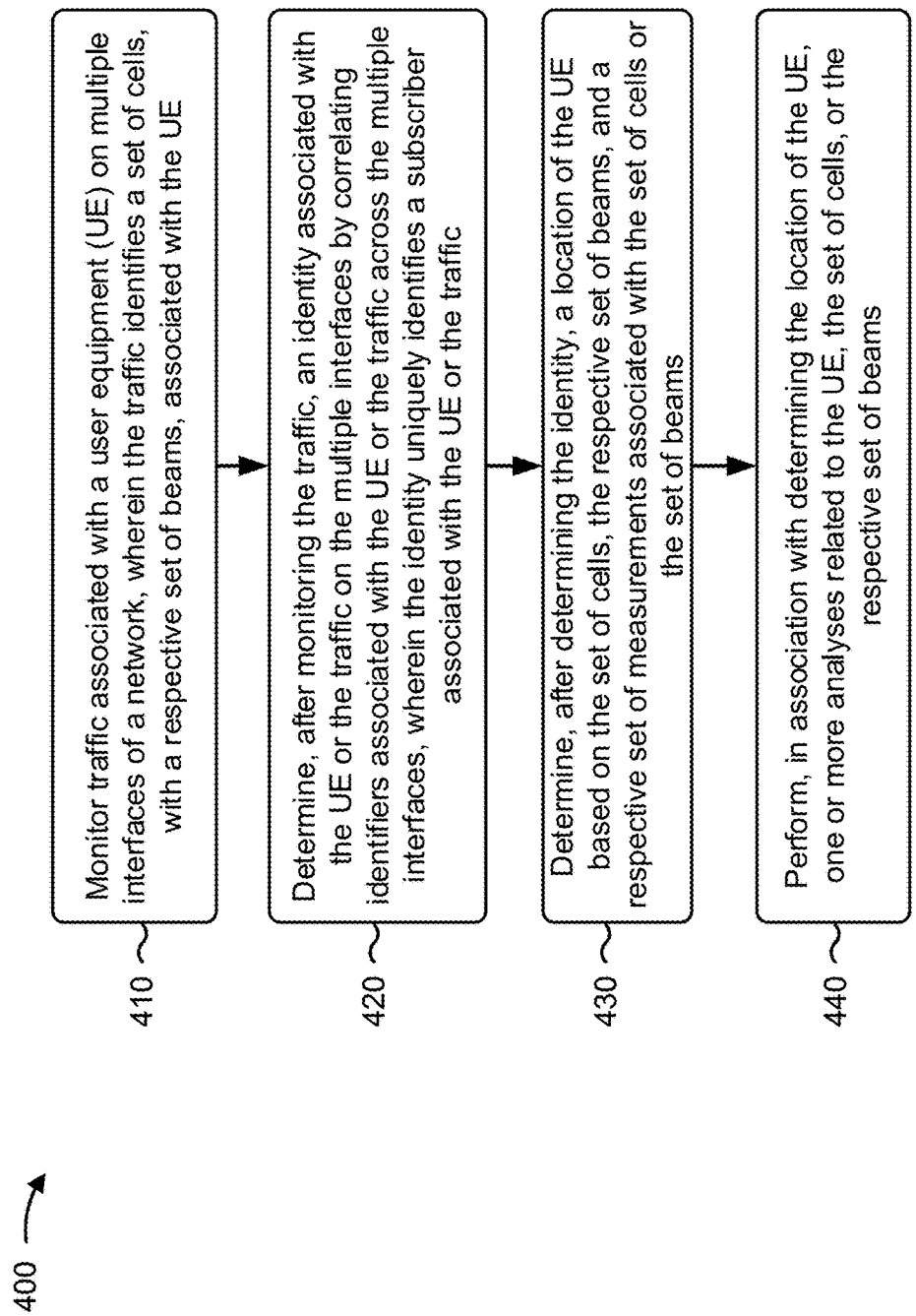
FIG. 4 is a flow chart of an example process for geolocating a user equipment.

FIG. 4 is a flow chart of an example process 400 for geolocating a user equipment. In some implementations, one or more process blocks of FIG. 4 may be performed by a traffic monitoring device (e.g., traffic monitoring device 260). In some implementations, one or more process blocks of FIG. 4 may be performed by another device or a group of devices separate from or including the traffic monitoring device, such as a UE (e.g., UE 210), a MeNB (e.g., MeNB 220), a SgNB (e.g., SgNB 230), a MME (e.g., MME 240), a SGW (e.g., SGW 250), and a network probe (e.g., network probe 270).

As shown in FIG. 4, process 400 may include monitoring traffic associated with a user equipment (UE) on multiple interfaces of a network, wherein the traffic identifies a set of cells, with a respective set of beams, associated with the UE (block 410). For example, the traffic monitoring device (e.g., traffic monitoring device 260 using processor 320, communication interface 370, and/or the like) may monitor traffic associated with a user equipment (UE) on multiple interfaces of a network, as described above. In some implementations, the traffic identifies a set of cells, with a respective set of beams, associated with the UE.

As further shown in FIG. 4, process 400 may include determining, after monitoring the traffic, an identity associated with the UE or the traffic on the multiple interfaces by correlating identifiers associated with the UE or the traffic across the multiple interfaces, wherein the identity uniquely identifies a subscriber associated with the UE or the traffic (block 420). For example, the traffic monitoring device (e.g., traffic monitoring device 260 using processor 320, and/or the like) may determine, after monitoring the traffic, an identity associated with the UE or the traffic on the multiple interfaces by correlating identifiers associated with the UE or the traffic across the multiple interfaces, as described above. In some implementations, the identity uniquely identifies a subscriber associated with the UE or the traffic.

As further shown in FIG. 4, process 400 may include determining, after determining the identity, a location of the UE based on the set of cells, the respective set of beams, and a respective set of measurements associated with the set of cells or the set of beams (block 430). For example, the traffic monitoring device (e.g., traffic monitoring device 260 using processor 320, and/or the like) may determine, after determining the identity, a location of the UE based on the set of cells, the respective set of beams, and a respective set of measurements associated with the set of cells or the respective set of beams, as described above.

As further shown in FIG. 4, process 400 may include performing, in association with determining the location of the UE, one or more analyses related to the UE, the set of cells, or the respective set of beams (block 440). For example, the traffic monitoring device (e.g., traffic monitoring device 260 using processor 320, memory 330, storage component 340, output component 360, communication interface 370, and/or the like) may perform, in association with determining the location of the UE, one or more analyses related to the UE, the set of cells, or the respective set of beams, as described above.

Process 400 may include additional implementations, such as any single implementation or any combination of implementations described below and/or in connection with one or more other processes described elsewhere herein.

In some implementations, the multiple interfaces include: a third generation partnership project (3GPP) F1 interface associated with a first network probe, a 3GPP S1-mobility management entity (MME) interface associated with a second network probe, a 3GPP S1-U interface associated with a third network probe, a 3GPP S11 interface associated with a fourth network probe, a 3GPP X2 interface associated with a fifth network probe, a 3GPP NG-C(N1/N2) interface associated with a sixth network probe, or a 3GPP NG-U(N3) interface associated with a seventh network probe. In some implementations, the traffic includes a measurement report associated with the set of cells or the respective set of beams.

In some implementations, the traffic monitoring device may identify at least one of: a set of connected beams, of the respective set of beams, associated with the UE that identifies the location of the UE relative to a base station, wherein the set of connected beams includes a coverage beam or a user-dedicated data beam, a set of surrounding beams, of the respective set of beams, associated with the UE, or the respective set of measurements for the set of surrounding beams that identifies a position of the UE within the connected beam relative to the set of surrounding beams, and may determine the location of the UE after identifying the at least one of the connected beam, the set of surrounding beams, or the respective set of measurements. In some implementations, the traffic monitoring device may identify at least one of: a change in a connected beam, of the respective set of beams, associated with the UE, a change in a set of surrounding beams, of the respective set of beams, associated with the UE, or a change in the respective set of measurements associated with the connected beam or the set of surrounding beams, and may determine a direction of movement of the UE after identifying the at least one of the change in the connected beam, the change in the set of surrounding beams, or the change in the respective set of measurements.

In some implementations, the traffic monitoring device may identify at least one of: a missing connected beam from the respective set of beams, a missing surrounding beam from a set of surrounding beams associated with the UE, or a measurement associated with the respective set of beams that satisfies a threshold, and may identify a location of a physical obstruction to a subset of the respective set of beams after identifying the at least one of the missing connected beam, the missing surrounding beam, or the measurement that satisfies the threshold. In some implementations, the traffic monitoring device may identify at least one of: an unexpected connected beam, of the respective set of beams, associated with the UE, or an unexpected surrounding beam, of the respective set of beams, associated with the UE, and may identify a beam reflection of a subset of the respective set of beams after identifying the at least one of the unexpected connected beam, or the unexpected surrounding beam.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
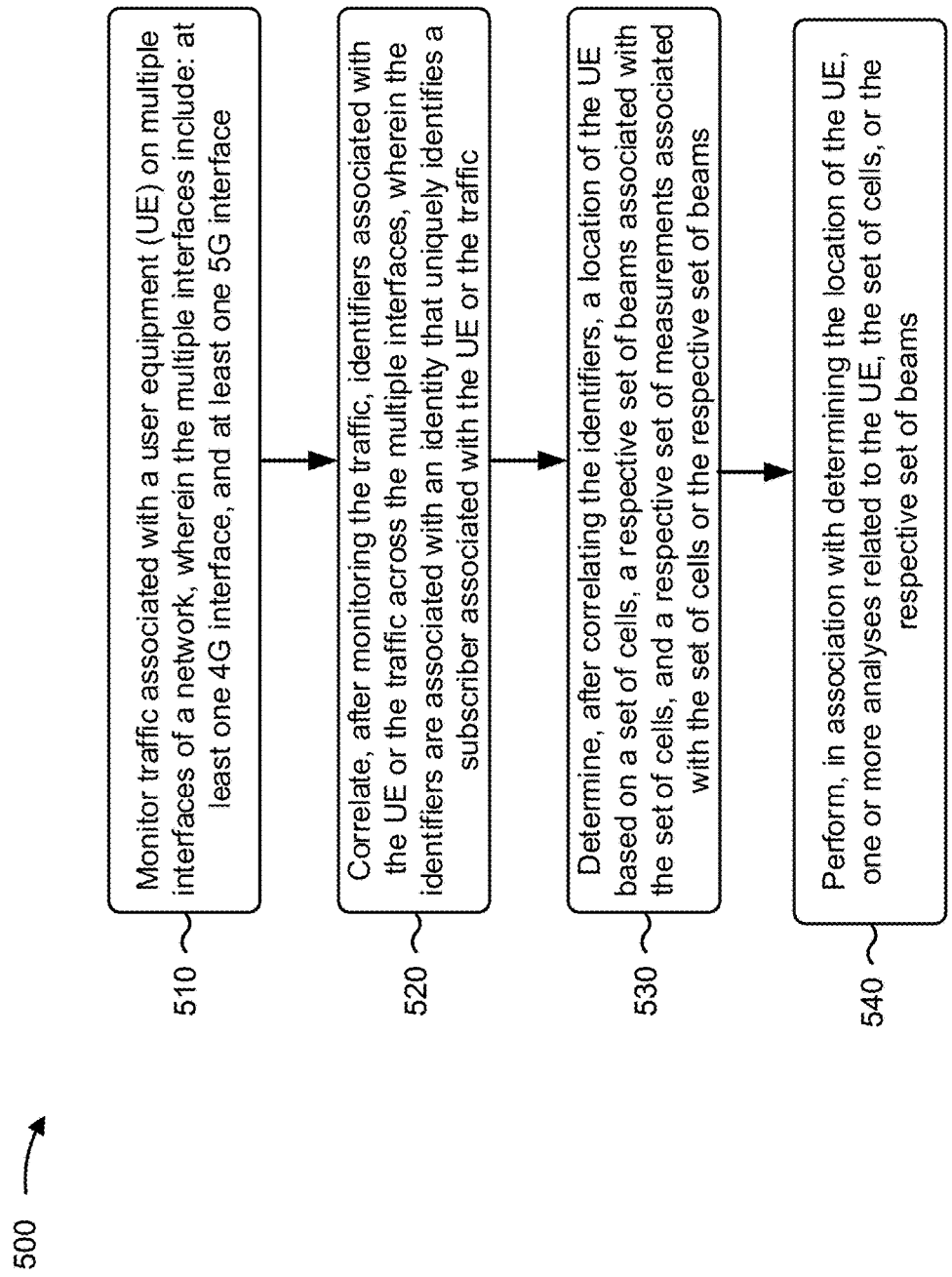
FIG. 5 is a flow chart of an example process for geolocating a user equipment.

FIG. 5 is a flow chart of an example process 500 for geolocating a user equipment. In some implementations, one or more process blocks of FIG. 5 may be performed by a traffic monitoring device (e.g., traffic monitoring device 260). In some implementations, one or more process blocks of FIG. 5 may be performed by another device or a group of devices separate from or including the traffic monitoring device, such as a UE (e.g., UE 210), a MeNB (e.g., MeNB 220), a SgNB (e.g., SgNB 230), a MME (e.g., MME 240), a SGW (e.g., SGW 250), and a network probe (e.g., network probe 270).

As shown in FIG. 5, process 500 may include monitoring traffic associated with a user equipment (UE) on multiple interfaces of a network, wherein the multiple interfaces include: at least one 4G interface, and at least one 5G interface (block 510). For example, the traffic monitoring device (e.g., traffic monitoring device 260 using processor 320, communication interface 370, and/or the like) may monitor traffic associated with a user equipment (UE) on multiple interfaces of a network, as described above. In some implementations, the multiple interfaces include: at least one 4G interface, and at least one 5G interface.

As further shown in FIG. 5, process 500 may include correlating, after monitoring the traffic, identifiers associated with the UE or the traffic across the multiple interfaces, wherein the identifiers are associated with an identity that uniquely identifies a subscriber associated with the UE or the traffic (block 520). For example, the traffic monitoring device (e.g., traffic monitoring device 260 using processor 320, and/or the like) may correlate, after monitoring the traffic, identifiers associated with the UE or the traffic across the multiple interfaces, as described above. In some implementations, the identifiers are associated with an identity that uniquely identifies a subscriber associated with the UE or the traffic.

As further shown in FIG. 5, process 500 may include determining, after correlating the identifiers, a location of the UE based on a set of cells, a respective set of beams associated with the set of cells, and a respective set of measurements associated with the set of cells or the respective set of beams (block 530). For example, the traffic monitoring device (e.g., traffic monitoring device 260 using processor 320, and/or the like) may determine, after correlating the identifiers, a location of the UE based on a set of cells, a respective set of beams associated with the set of cells, and a respective set of measurements associated with the set of cells or the respective set of beams, as described above.

As further shown in FIG. 5, process 500 may include performing, in association with determining the location of the UE, one or more analyses related to the UE, the set of cells, or the respective set of beams (block 540). For example, the traffic monitoring device (e.g., traffic monitoring device 260 using processor 320, memory 330, storage component 340, output component 360, communication interface 370, and/or the like) may perform, in association with determining the location of the UE, one or more analyses related to the UE, the set of cells, or the respective set of beams, as described above.

Process 500 may include additional implementations, such as any single implementation or any combination of implementations described below and/or in connection with one or more other processes described elsewhere herein.

In some implementations, the traffic monitoring device may determine the location of the UE by identifying at least one of: a connected beam, of the respective set of beams, associated with the UE that identifies the location of the UE relative to a base station, a set of surrounding beams, of the respective set of beams, associated with the UE, or the respective set of measurements for the set of surrounding beams that identifies a position of the UE within the connected beam relative to the set of surrounding beams. In some implementations, the traffic monitoring device may generate a heat map related to the set of cells or the respective set of beams after performing the one or more analyses related to the UE, the set of cells, or the respective set of beams, and may provide the heat map for display via a display associated with another UE after generating the heat map, or provide data related to the heat map as a data export to a storage location.

In some implementations, the traffic monitoring device may provide a stream of data related to the set of cells or related to the respective set of beams to another UE associated with a technician. In some implementations, the traffic monitoring device may generate a virtual map that includes an identifier for the location of the UE after performing the one or more analyses, and may provide the virtual map for display via a display associated with another UE after generating the virtual map.

In some implementations, the respective set of beams includes a set of surrounding beams and a set of connected beams. In some implementations, the traffic identifies at least one of: a respective reference signal received power (RSRP) of the respective set of beams, a respective reference signal received quality (RSRQ) of the respective set of beams, or a respective signal-to-interference-plus-noise ratio (SINR) of the respective set of beams.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
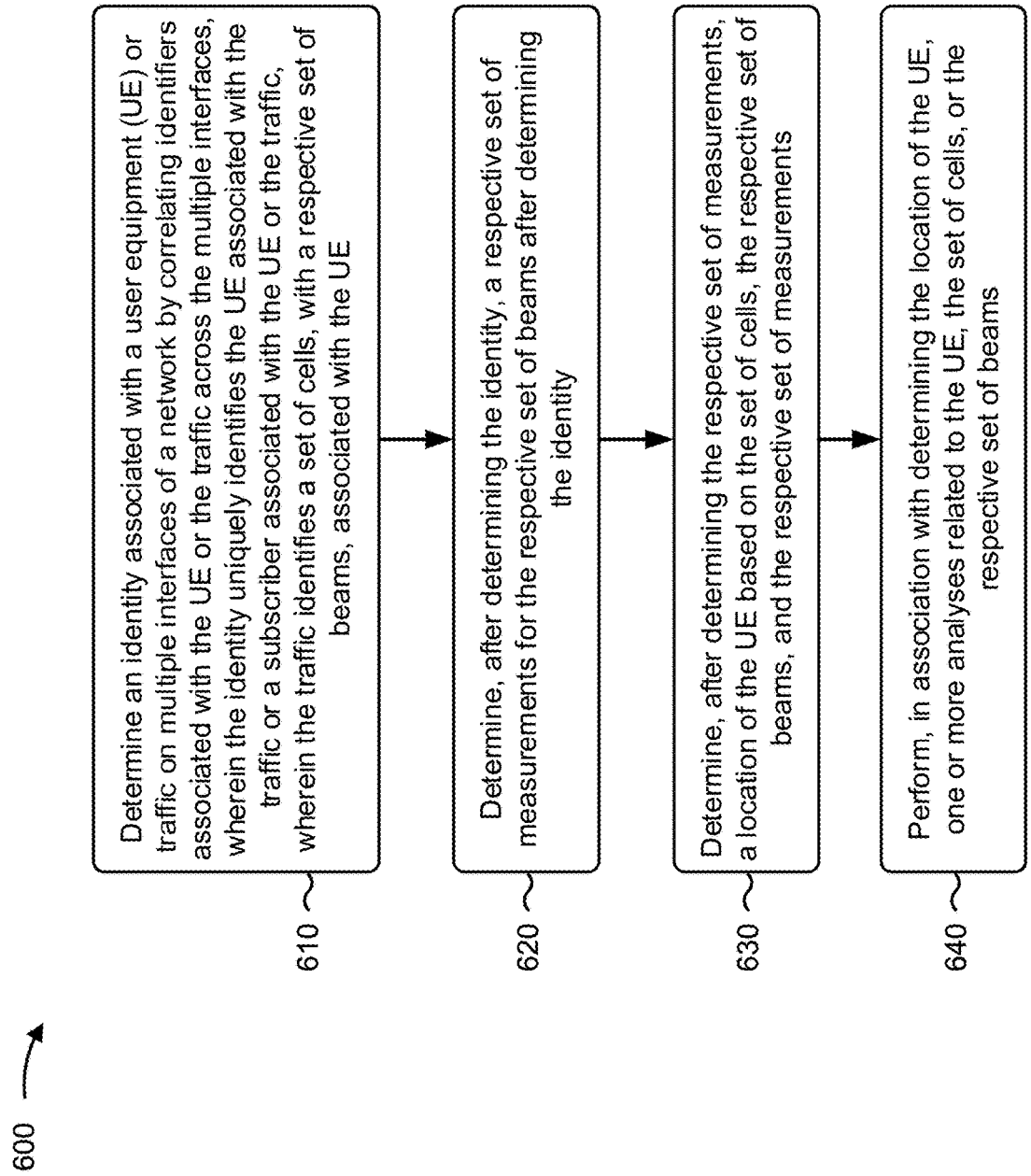
FIG. 6 is a flow chart of an example process for geolocating a user equipment.

FIG. 6 is a flow chart of an example process 600 for geolocating a user equipment. In some implementations, one or more process blocks of FIG. 6 may be performed by a traffic monitoring device (e.g., traffic monitoring device 260). In some implementations, one or more process blocks of FIG. F1 may be performed by another device or a group of devices separate from or including the traffic monitoring device, such as a UE (e.g., UE 210), a MeNB (e.g., MeNB 220), a SgNB (e.g., SgNB 230), a MME (e.g., MME 240), a SGW (e.g., SGW 250), and a network probe (e.g., network probe 270).

As shown in FIG. 6, process 600 may include determining an identity associated with a user equipment (UE) or traffic on multiple interfaces of a network by correlating identifiers associated with the UE or the traffic across the multiple interfaces, wherein the identity uniquely identifies the UE associated with the traffic or a subscriber associated with the UE or the traffic, wherein the traffic identifies a set of cells, with a respective set of beams, associated with the UE (block 610). For example, the traffic monitoring device (e.g., traffic monitoring device 260 using processor 320, and/or the like) may determine an identity associated with a user equipment (UE) or traffic on multiple interfaces of a network by correlating identifiers associated with the UE or the traffic across the multiple interfaces, as described above. In some implementations, the identity uniquely identifies the UE associated with the traffic or a subscriber associated with the UE or the traffic. In some implementations, the traffic identifies a set of cells, with a respective set of beams, associated with the UE.

As further shown in FIG. 6, process 600 may include determining, after determining the identity, a respective set of measurements for the respective set of beams after determining the identity (block 620). For example, the traffic monitoring device (e.g., traffic monitoring device 260 using processor 320, and/or the like) may determine, after determining the identity, a respective set of measurements for the respective set of beams after determining the identity, as described above.

As further shown in FIG. 6, process 600 may include determining, after determining the respective set of measurements, a location of the UE based on the set of cells, the respective set of beams, and the respective set of measurements (block 630). For example, the traffic monitoring device (e.g., traffic monitoring device 260 using processor 320, and/or the like) may determine, after determining the respective set of measurements, a location of the UE based on the set of cells, the respective set of beams, and the respective set of measurements, as described above.

As further shown in FIG. 6, process 600 may include performing, in association with determining the location of the UE, one or more analyses related to the UE, the set of cells, or the respective set of beams (block 640). For example, the traffic monitoring device (e.g., traffic monitoring device 260 using processor 320, memory 330, storage component 340, output component 360, communication interface 370, and/or the like) may perform, in association with determining the location of the UE, one or more analyses related to the UE, the set of cells, or the respective set of beams, as described above.

Process 600 may include additional implementations, such as any single implementation or any combination of implementations described below and/or in connection with one or more other processes described elsewhere herein.

In some implementations, the traffic monitoring device may identifying a location of a physical obstruction to a subset of the respective set of beams by identifying at least one of: a missing connected beam from the respective set of beams, a missing surrounding beam from a set of surrounding beams associated with the UE, or a measurement associated with the respective set of beams that satisfies a threshold. In some implementations, the traffic monitoring device may identify a beam reflection of a subset of the respective set of beams by identifying at least one of: an unexpected connected beam, of the respective set of beams, associated with the UE, or an unexpected surrounding beam, of the respective set of beams, associated with the UE.

In some implementations, the respective set of measurements identifies at least one of: a respective reference signal received power (RSRP) of the respective set of beams, a respective reference signal received quality (RSRQ) of the respective set of beams, or a respective signal-to-interference-plus-noise ratio (SINR) of the respective set of beams.

In some implementations, the traffic monitoring device may aggregate a respective result of the one or more analyses across multiple UEs after performing the one or more analyses, wherein the multiple UEs include the UE, and may generate a set of recommendations related to reconfiguring a coverage of the set of cells or the respective set of beams after aggregating the respective result of the one or more analyses across the multiple UEs. In some implementations, the traffic monitoring device may perform trouble shooting of an issue related to the UE after performing the one or more analyses.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
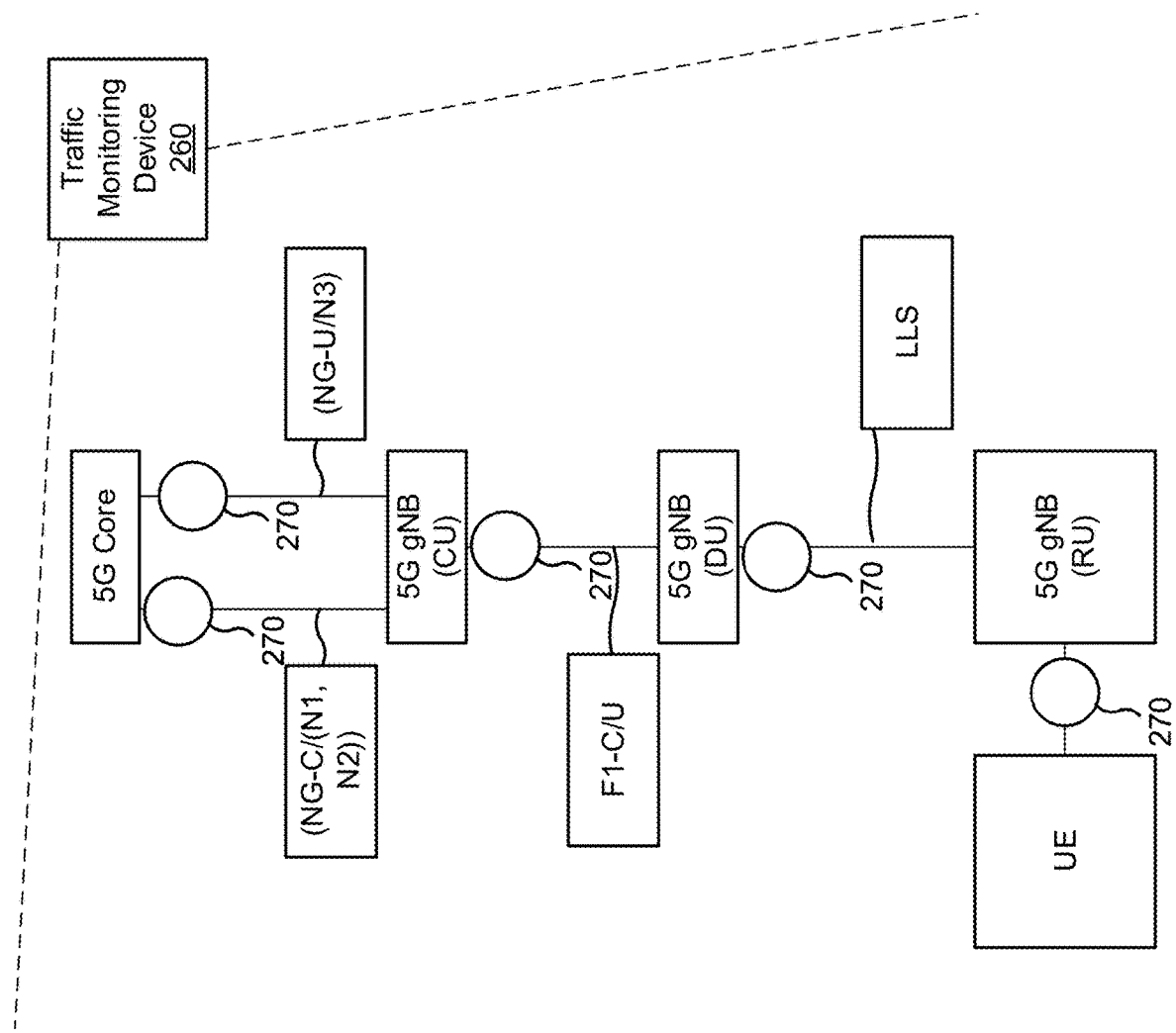
FIG. 7 is a diagram of an example implementation described herein.

FIG. 7 is a diagram of an example implementation 700 described herein. FIG. 7 shows an example standalone architecture (SA) in which implementations described herein can be implemented.

As shown, implementation 700 may include a 5G core, various 5G gNBs, and a UE. As further shown in FIG. 7, implementation 700 may include various interfaces between elements of the SA. For example, the SA may include a NG-C/(N1, N2) interface (e.g., via which an IMSI, a subscriber identifier, and/or the like may be obtained, via which a IMEI, a IMEISV, a device identifier, and/or the like may be obtained, and/or the like), a NG-U/N3 interface (e.g., via which data related to a user experience, such as throughput, and/or the like may be obtained), a F1-C/U interface (e.g., via which measurement reports, beam identifiers, cell identifiers, RSRP, RSRQ, SINR, and/or the like may be obtained), a lower layer split (LLS) interface, and/or the like.

As further shown various network probes 270 may be deployed on the various interfaces to monitor the various interfaces in a manner that is the same as or similar to that described elsewhere herein. In some implementations, traffic monitoring device 260 may process data from the various network probes 270 in a manner that is the same as or similar to that described elsewhere herein.

As indicated above, FIG. 7 is provided merely as an example. Other examples are possible and may differ from what was described with regard to FIG. 7.

Figure 8A:
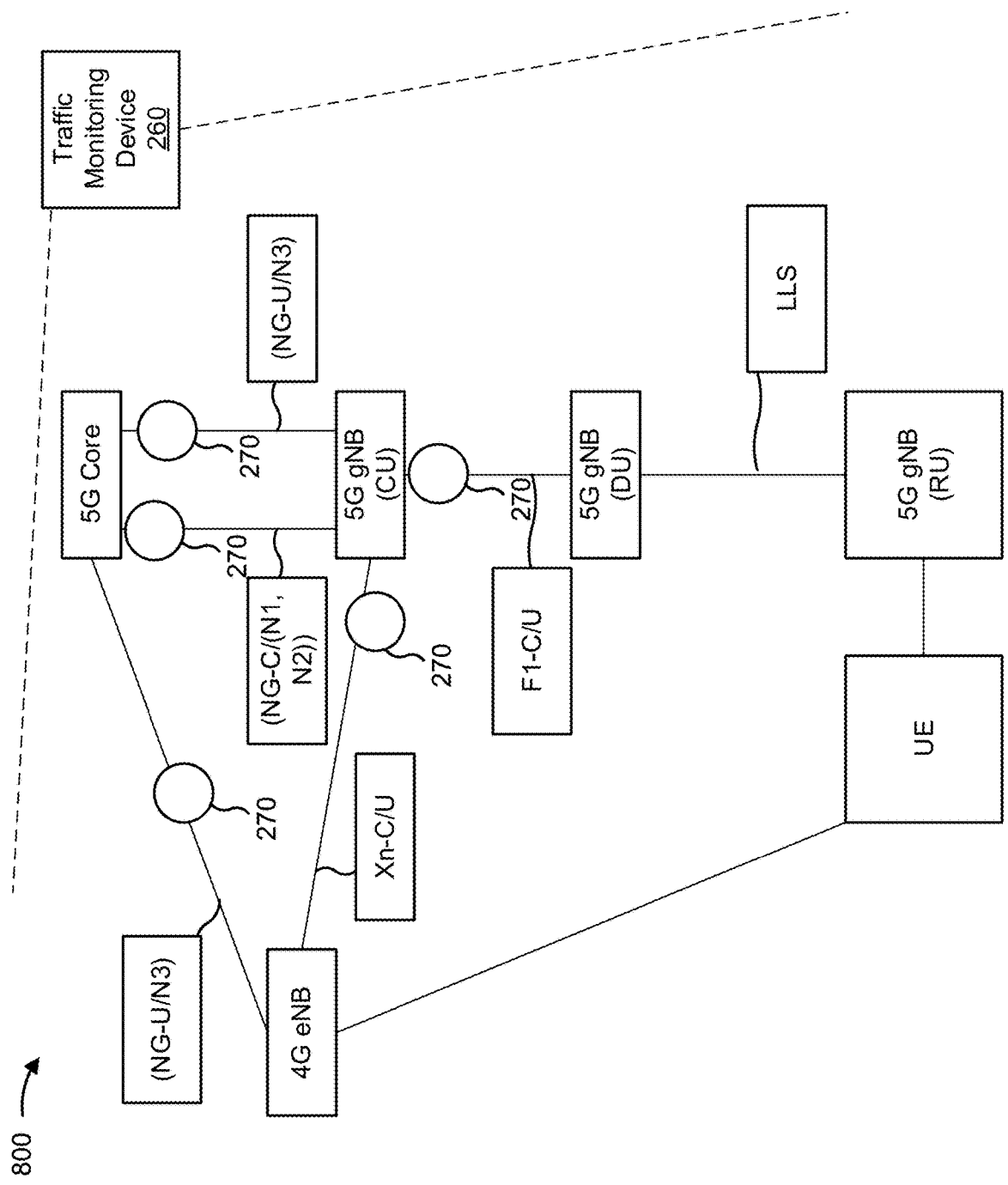
FIGS. 8A and 8B are diagrams of an example implementation described herein.
Figure 8B:
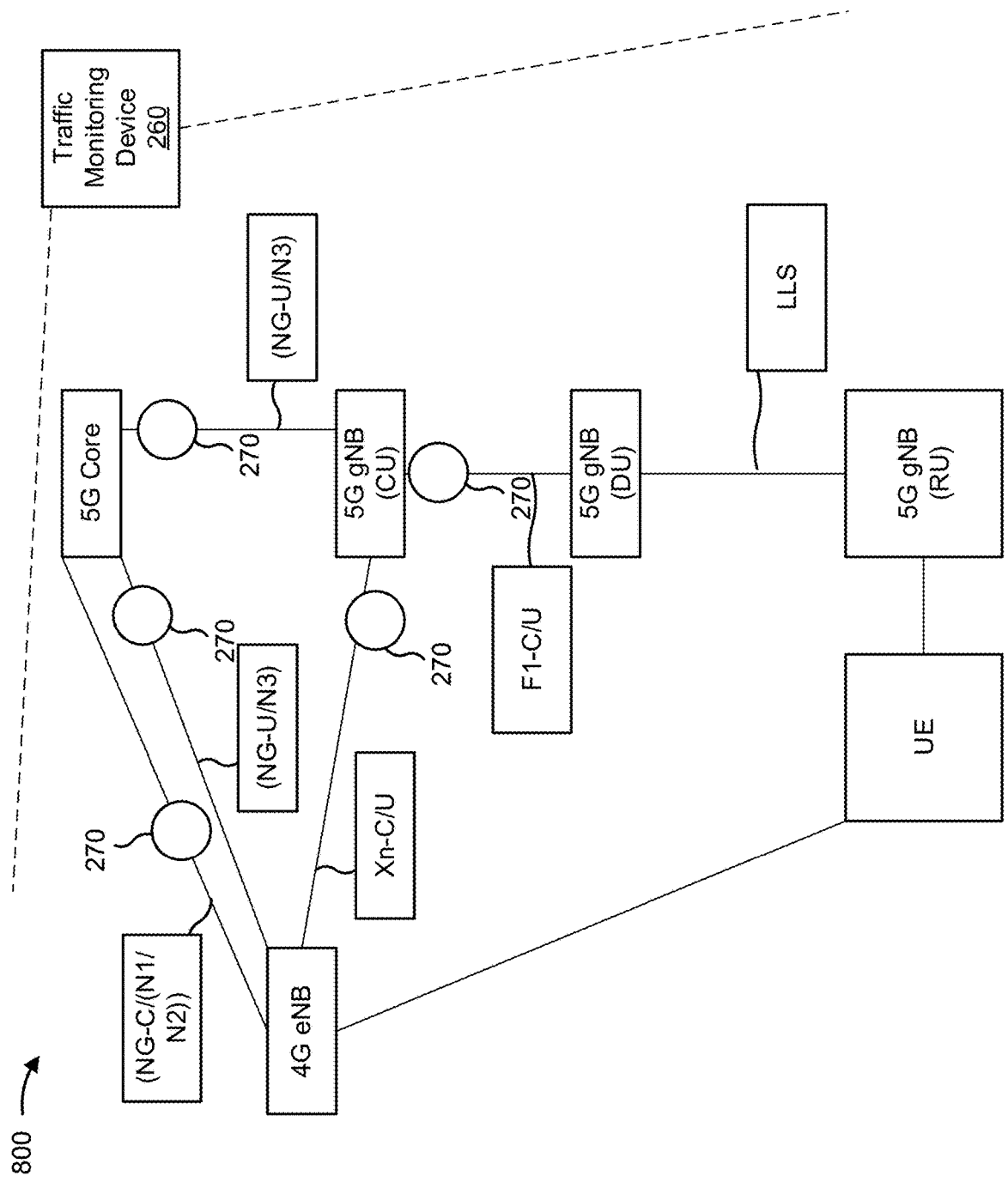

FIGS. 8A and 8B are diagrams of an example implementation 800 described herein. FIG. 8A shows an example non-standalone architecture (NSA) in which implementations described herein may be implemented.

As shown in FIG. 8A, implementation 800 may include a 5G core, various 5G gNBs, a 4G eNB, and a UE. As further shown in FIG. 8A, implementation 800 may include various interfaces between elements of the NSA. For example, the NSA may include a NG-C/(N1, N2) interface (e.g., via which an IMSI, a subscriber identifier, and/or the like may be obtained, via which a IMEI, a IMEISV, a device identifier, and/or the like may be obtained, and/or the like), various NG-U/N3 interfaces (e.g., via which data related to a user experience, such as throughput data, and/or the like may be obtained), a F1-C/U interface (e.g., via which measurement reports, beam identifiers, cell identifiers, RSRP, RSRQ, SINR, and/or the like may be obtained), a Xn-C/U interface (e.g., measurement reports may be obtained from the Xn-C interface and user plane throughput data may be obtained from the Xn-U interface), a lower layer split (LLS) interface, and/or the like.

As further shown various network probes 270 may be deployed on the various interfaces to monitor the various interfaces in a manner that is the same as or similar to that described elsewhere herein. In some implementations, traffic monitoring device 260 may process data from the various network probes 270 in a manner that is the same as or similar to that described elsewhere herein.

FIG. 8B shows another example NSA in which implementations described herein may be implemented. As shown in FIG. 8B, the other example NSA may include similar elements and/or interfaces as that described above with regard to FIG. 8A, but in a different configuration. For example, the other example NSA shown in FIG. 8B may include an NG-C/(N1, N2) interface between a 4G eNB and a 5G core, rather than between the 5G core and a 5G gNB (CU).

As indicated above, FIGS. 8A and 8B are provided merely as an example. Other examples are possible and may differ from what was described with regard to FIGS. 8A and 8B.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:

monitoring, by a device, traffic associated with a user equipment (UE) on multiple interfaces of a network,
wherein the traffic identifies a set of cells, with a respective set of beams, associated with the UE;

determining, by the device and after monitoring the traffic, an identity associated with the UE or the traffic on the multiple interfaces by correlating identifiers associated with the UE or the traffic across the multiple interfaces,
wherein the identity uniquely identifies a subscriber associated with the UE or the traffic;

determining, by the device and after determining the identity, a location of the UE based on the set of cells, the respective set of beams, and a respective set of measurements associated with the set of cells or the set of beams;

performing, by the device and in association with determining the location of the UE, one or more analyses related to the UE, the set of cells, or the respective set of beams;

aggregating, by the device, a respective result of the one or more analyses across multiple UEs after performing the one or more analyses,
wherein the multiple UEs include the UE; and generating, by the device, a set of recommendations related to reconfiguring a coverage of the set of cells or the respective set of beams after aggregating the respective result of the one or more analyses across the multiple UEs.

2. The method of claim 1, wherein the multiple interfaces include:

a third generation partnership project (3GPP) F1 interface associated with a first network probe, a 3GPP S1-mobility management entity (MME) interface associated with a second network probe, a 3GPP S1-U interface associated with a third network probe, a 3GPP S11 interface associated with a fourth network probe, a 3GPP X2 interface associated with a fifth network probe, a 3GPP NG-C(N1/N2) interface associated with a sixth network probe, or a 3GPP NG-U(N3) interface associated with a seventh network probe.

3. The method of claim 1, wherein the traffic includes a measurement report associated with the set of cells or the respective set of beams.

4. The method of claim 1, further comprising:

identifying at least one of:

a set of connected beams, of the respective set of beams, associated with the UE that identifies the location of the UE relative to a base station,
wherein the set of connected beams includes a coverage beam or a user-dedicated data beam, a set of surrounding beams, of the respective set of beams, associated with the UE, or the respective set of measurements for the set of surrounding beams that identifies a position of the UE within a connected beam, of the set of connected beams, relative to the set of surrounding beams; and wherein determining the location of the UE comprises:

determining the location of the UE after identifying the at least one of the connected beam, the set of surrounding beams, or the respective set of measurements.

5. The method of claim 1, wherein performing the one or more analyses comprises:

identifying at least one of:

a change in a connected beam, of the respective set of beams, associated with the UE, a change in a set of surrounding beams, of the respective set of beams, associated with the UE, or a change in the respective set of measurements associated with the connected beam or the set of surrounding beams; and determining a direction of movement of the UE after identifying the at least one of the change in the connected beam, the change in the set of surrounding beams, or the change in the respective set of measurements.

6. The method of claim 1, wherein performing the one or more analyses comprises:

identifying at least one of:

a missing connected beam from the respective set of beams, a missing surrounding beam from a set of surrounding beams associated with the UE, or a measurement associated with the respective set of beams that satisfies a threshold; and identifying a location of a physical obstruction to a subset of the respective set of beams after identifying the at least one of the missing connected beam, the missing surrounding beam, or the measurement that satisfies the threshold.

7. The method of claim 1, wherein performing the one or more analyses comprises:

identifying at least one of:

an unexpected connected beam, of the respective set of beams, associated with the UE, or an unexpected surrounding beam, of the respective set of beams, associated with the UE; and identifying a beam reflection of a subset of the respective set of beams after identifying the at least one of the unexpected connected beam, or the unexpected surrounding beam.

8. A device, comprising:

one or more memories; and one or more processors, communicatively coupled to the one or more memories, configured to:

monitor traffic associated with a user equipment (UE) on multiple interfaces of a network,
wherein the multiple interfaces include:
at least one 4G interface, and
at least one 5G interface;

correlate, after monitoring the traffic, identifiers associated with the UE or the traffic across the multiple interfaces,
wherein the identifiers are associated with an identity that uniquely identifies a subscriber associated with the UE or the traffic;

determine, after correlating the identifiers, a location of the UE based on a set of cells, a respective set of beams associated with the set of cells, and a respective set of measurements associated with the set of cells or the respective set of beams;

perform, in association with determining the location of the UE, one or more analyses related to the UE, the set of cells, or the respective set of beams;

aggregate a respective result of the one or more analyses across multiple UEs after performing the one or more analyses,
wherein the multiple UEs include the UE; and generate a set of recommendations related to reconfiguring a coverage of the set of cells or the respective set of beams after aggregating the respective result of the one or more analyses across the multiple UEs.

9. The device of claim 8, wherein the one or more processors, when determining the location of the UE, are configured to:
determine the location of the UE by identifying at least one of:
a connected beam, of the respective set of beams, associated with the UE that identifies the location of the UE relative to a base station,
a set of surrounding beams, of the respective set of beams, associated with the UE, or
the respective set of measurements for the set of surrounding beams that identifies a position of the UE within the connected beam relative to the set of surrounding beams.

10. The device of claim 8, wherein the one or more processors are further configured to:
generate a heat map related to the set of cells or the respective set of beams after performing the one or more analyses related to the UE, the set of cells, or the respective set of beams; and
provide the heat map for display via a display associated with another UE after generating the heat map, or
provide data related to the heat map as a data export to a storage location.

11. The device of claim 8, wherein the one or more processors are further configured to:
provide a stream of data related to the set of cells or related to the respective set of beams to another UE associated with a technician.

12. The device of claim 8, wherein the one or more processors are further configured to:
generate a virtual map that includes an identifier for the location of the UE after performing the one or more analyses; and
provide the virtual map for display via a display associated with another UE after generating the virtual map.

13. The device of claim 8, wherein the respective set of beams includes a set of surrounding beams and a set of connected beams.

14. The device of claim 8, wherein the traffic identifies at least one of:
a respective reference signal received power (RSRP) of the respective set of beams,
a respective reference signal received quality (RSRQ) of the respective set of beams, or
a respective signal-to-interference-plus-noise ratio (SINR) of the respective set of beams.

15. A non-transitory computer-readable medium storing instructions, the instructions comprising:
one or more instructions that, when executed by one or more processors of a device, cause the one or more processors to:
determine an identity associated with a user equipment (UE) or traffic on multiple interfaces of a network by correlating identifiers associated with the UE or the traffic across the multiple interfaces,
wherein the identity uniquely identifies the UE associated with the traffic or a subscriber associated with the UE or the traffic,
wherein the traffic identifies a set of cells, with a respective set of beams, associated with the UE;

determine, after determining the identity, a respective set of measurements for the respective set of beams after determining the identity;

determine, after determining the respective set of measurements, a location of the UE based on the set of cells, the respective set of beams, and the respective set of measurements;

perform, in association with determining the location of the UE, one or more analyses related to the UE, the set of cells, or the respective set of beams; and aggregate a respective result of the one or more analyses across multiple UEs after performing the one or more analyses,
wherein the multiple UEs include the UE; and generate a set of recommendations related to reconfiguring a coverage of the set of cells or the respective set of beams after aggregating the respective result of the one or more analyses across the multiple UEs.

16. The non-transitory computer-readable medium of claim 15, wherein the one or more instructions, that cause the one or more processors to perform the one or more analyses, cause the one or more processors to:
identifying a location of a physical obstruction to a subset of the respective set of beams by identifying at least one of:
a missing connected beam from the respective set of beams,
a missing surrounding beam from a set of surrounding beams associated with the UE, or
a measurement associated with the respective set of beams that satisfies a threshold.

17. The non-transitory computer-readable medium of claim 15, wherein the one or more instructions, that cause the one or more processors to perform the one or more analyses, cause the one or more processors to:
identify a beam reflection of a subset of the respective set of beams by identifying at least one of:
an unexpected connected beam, of the respective set of beams, associated with the UE, or
an unexpected surrounding beam, of the respective set of beams, associated with the UE.

18. The non-transitory computer-readable medium of claim 15, wherein the respective set of measurements identifies at least one of:
a respective reference signal received power (RSRP) of the respective set of beams,
a respective reference signal received quality (RSRQ) of the respective set of beams, or
a respective signal-to-interference-plus-noise ratio (SINR) of the respective set of beams.

19. The non-transitory computer-readable medium of claim 15, wherein the one or more instructions, when executed by the one or more processors, further cause the one or more processors to:
perform trouble shooting of an issue related to the UE after performing the one or more analyses.

20. The non-transitory computer-readable medium of claim 15, wherein the multiple interfaces include:
   at least one 4G interface, and
   at least one 5G interface.

* * * * *